May 1, 1956 M. DEN HERTOG 2,744,163

TELEPHONE EXCHANGE EQUIPMENT

Filed March 23, 1953 14 Sheets-Sheet 1

Inventor
MARTINUS DEN HERTOG

By Robert Harding Jr.
Attorney

TELEPHONE EXCHANGE EQUIPMENT

Filed March 23, 1953 14 Sheets-Sheet 2

| DIRECTION | JCTS |
|---|---|
| DIRECT (20 DIRECTIONS) | 20x28 |
| TRANSIT "A" | 133 |
| TRANSIT "B" | 64 |
| SEMI B | 212 |
| TOLL | 58 |
| 7 OTHER LOCAL UNITS | 7x44 |
| TOTAL | 1335 |

| DIRECTION | JCTS |
|---|---|
| MANUAL | 595 |
| TRANSIT "B" | 595 |
| DIRECT (20 DIRECTIONS) | 20x66 |
| TOTAL PER THREE 10,000 LINE UNITS | 2510 |

Inventor
MARTINUS DEN HERTOG

By [signature]
Attorney

May 1, 1956 M. DEN HERTOG 2,744,163

TELEPHONE EXCHANGE EQUIPMENT

Filed March 23, 1953 14 Sheets-Sheet 3

INVENTOR.
M. DEN HERTOG
BY Robert Harding Jr.
ATTORNEY

May 1, 1956 M. DEN HERTOG 2,744,163

TELEPHONE EXCHANGE EQUIPMENT

Filed March 23, 1953 14 Sheets-Sheet 4

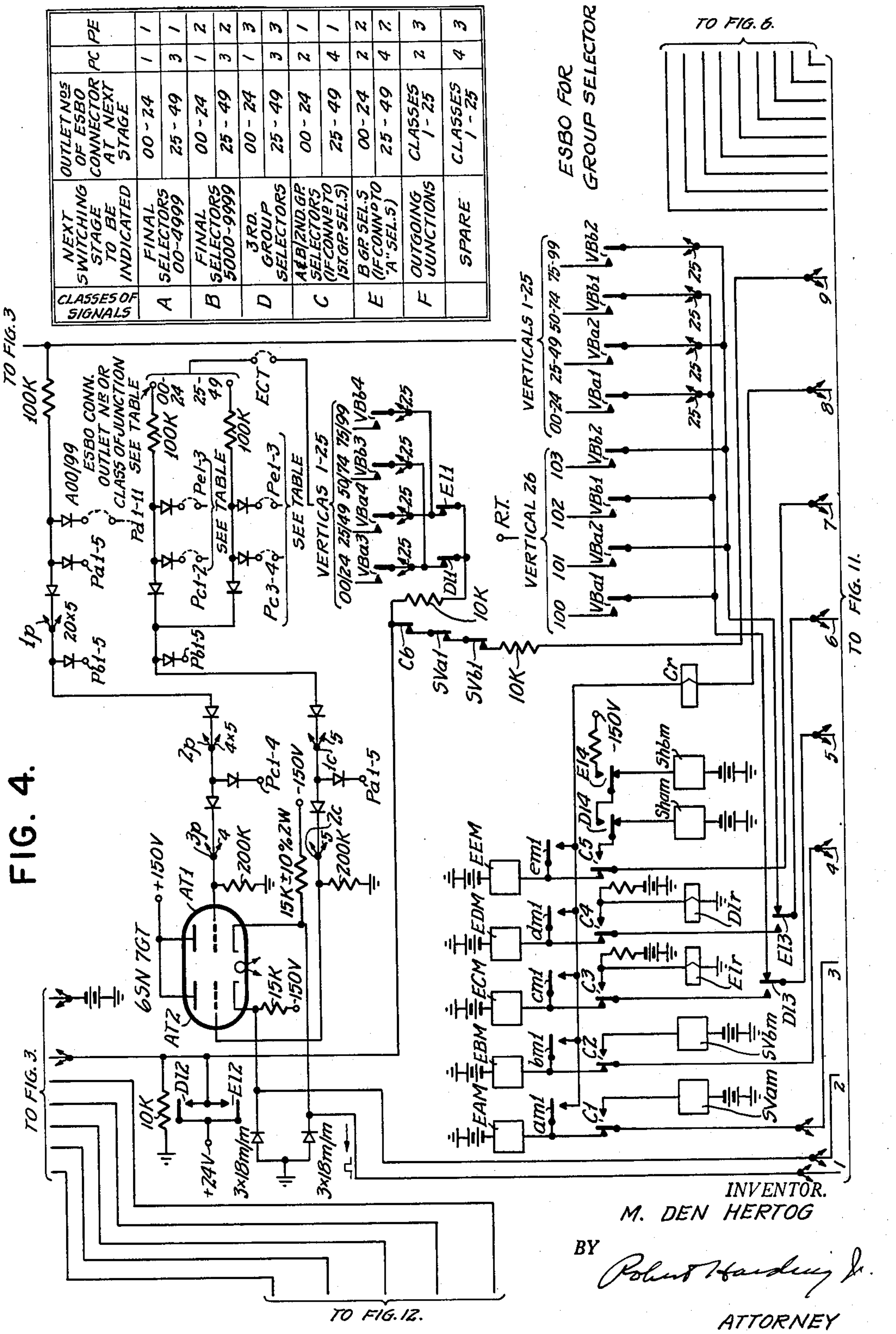

| CLASSES OF SIGNALS | NEXT SWITCHING STAGE TO BE INDICATED | OUTLET Nos OF ESBO CONNECTOR AT NEXT STAGE | PC | PE |
|---|---|---|---|---|
| A | FINAL SELECTORS 00-4999 | 00-24 | 1 | 1 |
| | | 25-49 | 3 | 1 |
| B | FINAL SELECTORS 5000-9999 | 00-24 | 1 | 2 |
| | | 25-49 | 3 | 2 |
| D | 3RD. GROUP SELECTORS | 00-24 | 1 | 3 |
| | | 25-49 | 3 | 3 |
| C | A&B 2ND GP SELECTORS (IF CONN TO 1ST GP SEL.5) | 00-24 | 2 | 1 |
| | | 25-49 | 4 | 1 |
| E | B GP SEL.5 (IF CONN TO "A" SEL.5) | 00-24 | 2 | 2 |
| | | 25-49 | 4 | 2 |
| F | OUTGOING JUNCTIONS | CLASSES 1-25 | 2 | 3 |
| | SPARE | CLASSES 1-25 | 4 | 3 |

FIG. 4.

INVENTOR.
M. DEN HERTOG
BY Robert Harding Jr.
ATTORNEY

May 1, 1956 M. DEN HERTOG 2,744,163

TELEPHONE EXCHANGE EQUIPMENT

Filed March 23, 1953 14 Sheets-Sheet 5

INVENTOR.
M. DEN HERTOG

BY Robert Harding Jr.

ATTORNEY

May 1, 1956 M. DEN HERTOG 2,744,163

TELEPHONE EXCHANGE EQUIPMENT

Filed March 23, 1953 14 Sheets-Sheet 6

INVENTOR.
M. DEN HERTOG

BY Robert Harding Jr.

ATTORNEY

May 1, 1956 M. DEN HERTOG 2,744,163

TELEPHONE EXCHANGE EQUIPMENT

Filed March 23, 1953 14 Sheets-Sheet 7

INVENTOR.
M. DEN HERTOG
BY Robert Harding Jr.
ATTORNEY

May 1, 1956 M. DEN HERTOG 2,744,163

TELEPHONE EXCHANGE EQUIPMENT

Filed March 23, 1953 14 Sheets-Sheet 8

INVENTOR.
M. DEN HERTOG
BY
Robert Harding Jr.
ATTORNEY

INVENTOR.
M. DEN HERTOG
BY
Robert Harding Jr.
ATTORNEY

May 1, 1956 M. DEN HERTOG 2,744,163

TELEPHONE EXCHANGE EQUIPMENT

Filed March 23, 1953 14 Sheets-Sheet 10

INVENTOR.

M. DEN HERTOG

BY Robert Harding Jr.

ATTORNEY

INVENTOR.
M. DEN HERTOG
BY Robert Harding Jr.
ATTORNEY

May 1, 1956 M. DEN HERTOG 2,744,163

TELEPHONE EXCHANGE EQUIPMENT

Filed March 23, 1953 14 Sheets-Sheet 12

INVENTOR.
M. DEN HERTOG

BY Robert Harding Jr.

ATTORNEY

May 1, 1956 M. DEN HERTOG 2,744,163

TELEPHONE EXCHANGE EQUIPMENT

Filed March 23, 1953 14 Sheets-Sheet 13

INVENTOR.
M. DEN HERTOG
BY Robert Harding Jr.
ATTORNEY

May 1, 1956 M. DEN HERTOG 2,744,163
TELEPHONE EXCHANGE EQUIPMENT
Filed March 23, 1953 14 Sheets-Sheet 14

INVENTOR.
M. DEN HERTOG
BY Robert Harding Jr.
ATTORNEY

United States Patent Office 2,744,163

Patented May 1, 1956

2,744,163

TELEPHONE EXCHANGE EQUIPMENT

Martinus den Hertog, Antwerp, Belgium, assignor to International Standard Electric Corporation, New York, N. Y., a corporation of Delaware Application March 23, 1953, Serial No. 343,871

Claims priority, application Great Britain January 16, 1950

27 Claims. (Cl. 179—18)

This invention relates to automatic telecommunication exchanges, and has for its object improved arrangements for controlling selection equipment in such exchanges.

According to one feature of the invention, register-controllers in such exchanges obtain direct and separate access to control equipments at a plurality of interconnecting stages.

Another feature of the invention comprises selector equipment for an automatic telecommunication exchange characterized by means for signalling the condition and class of an outlet in one operation.

Another feature of the invention comprises selector equipment for an automatic telecommunication exchange characterized by means for signalling the identity and idle condition of an outlet by one signal and for signalling the identity and busy condition of the outlet by a different signal.

A further feature of the invention comprises selection control equipment for controlling selection at a selector stage or stages characterized by signal responsive means adapted to control selection by detecting signals characteristic of the identity, condition, and class of outlets in one operation.

Yet another feature of the invention comprises an automatic telecommunication exchange comprising selector equipment and selection control equipment characterized by means in the selector equipment for signalling the identity, condition, and class of an outlet in one operation, by signal responsive means in the selection control equipment adapted to select an outlet at a selector stage, and by signal responsive means in the selection control equipment for determining the class of outlet selected, said selection means and said class discriminating means both responding during said single signalling operation.

Another feature of the invention comprises an automatic telecommunication exchange comprising at a selector stage groups of individual selector switch circuits and common control circuits each associated with one group of individual selector switch circuits, and comprising register control equipments for controlling selection at said selector stage in accordance with requirements received from a calling party, characterized by static electrical means in each of said common control equipments adapted to signal the identity, condition, and class of both individual outlets and of P. B. X outlets from the associated group of selector switches to register control equipment, and circuit arrangements between said common control equipments and said register control equipment, whereby a plurality of register control equipments can select individual outlets and P. B. X outlets from the same continuous stream of selection signals from a single common control circuit to which they are connected during the same period.

Other features will appear as the description of the invention proceeds.

THE MULTI-SWITCH

The invention utilizes a particular type of multi-selector switch in each selector stage and in the connecting equipment for connecting the various control circuits to the register controllers. The details of this multi-selector switch form no part of the present invention and only those parts of the switch have been illustrated which are necessary to an understanding of the invention.

The multi-selector comprises a number of individual selectors which share a common bare wire multiple and a common selecting mechanism. The bare wire multiple is arranged in a vertical manner and the individual selectors are arranged in a horizontal manner in the multi-selector. Each individual selector is provided with a set of inlet wires. If a multi-selector gives access to 100 outlets, for example, there will be 100 sets of vertical multiple wires, with any one of which sets any of the sets of inlet wires may be brought into contact. This contact is effected by means of flexible contact springs under the combined action of vertical and horizontal bars, each horizontal bar corresponding to one of the individual selectors, or inlets, and each vertical bar corresponding to two of the outlets, or sets of vertical wires. At each intersecting point of a horizontal inlet and two sets of vertical outlets the contacts may be established by the combined action of the corresponding horizontal and vertical bars. The actual contact is established by means of a contact pusher which moves all individual contacts of the set of contacts concerned, and of which contact pushers, one is provided for each of the intersecting points between horizontal and vertical bars. As at each intersecting point contact may be established between one inlet and either of two outlets, one of these two outlets is selected by moving the contact pusher either in a forward or in a backward direction.

Summarizing the above, there will be as many horizontal bars as there are individual selectors in a multi-switch. The number of vertical bars is equal to half the number of outlets constituting the multiple of the multi-switch. At each intersecting point of horizontal and vertical bars a contact pusher is provided, which, by forward or backward movement, may bring the inlet corresponding to the horizontal bar into contact with one of the two outlets corresponding to the vertical bar.

The vertical bars are arranged in pairs, so that for a multi-switch with 100 outlets, the 50 vertical bars will be arranged in 25 pairs. In addition to these, a 26th pair is usually provided for routine test purposes, but may be left out of consideration for the moment. For the control of all vertical bars a set of five code selecting bars is provided at the bottom of the switch. Each of these bars is operated by one of a set of five code bar magnets which may be energized in any one of 25 different combinations so as to select one of the 25 pairs of vertical bars. When one or a combination of these code bar magnets is energized, the corresponding code bar will move and thereby select the corresponding pair of vertical bars, but the actual movement of these vertical bars does not yet take place. Only one of the two vertical bars indicated by the operated combination of code bar magnets may subsequently be caused to move by the operation of one of two common so-called "vertical servo" magnets, which are provided in common for all 25 pairs of vertical bars and which, in association with the code bar magnets of which the operated combination indicates the pair, causes one of the vertical bars of this pair to be moved upwards.

The selection of one of the 50 vertical bars therefore happens in two steps, first by the operation of a combination of five code bar selector magnets which, by the movement of the corresponding code bars, select one pair of bars out of 25, and next by the operation of one out of two vertical servo-magnets, which selects and lifts one of the vertical bars of the selected pair.

The horizontal bar associated with each individual selector is associated with an individual control magnet which, when operated, indicates that the associated horizontal bar has to be moved. The operation of this individual horizontal magnet may take place simultaneously with that of the code bars and vertical bar, but only after a vertical bar has been lifted, can the actual movement of the horizontal bar take place by means of one of two common so-called "horizontal servo" magnets, which causes the horizontal bar indicated by the operated horizontal magnet to be moved either in a left-hand or in a right-hand direction. The movement of the horizontal bar therefore happens also in two steps, first by the operation of the individual horizontal magnet which indicates the horizontal bar to be moved, and next by the operation of one of the two horizontal servo magnets, which causes the indicated horizontal bar to be moved either to the right or to the left and which thereby causes the contact pusher located at the intersection of the operated horizontal and vertical bars to be moved either in a forward or a backward direction, thereby closing one set of contacts.

After these operations have happened, the code bar magnets de-energize and the vertical servo-magnet also releases, so that both the code bars and the vertical bar return to their original position. The common horizontal servo-magnet operated also releases, but the individual horizontal magnet is held energized and holds the horizontal bar mechanically locked in its operated position, which thereby keeps a contact pusher in operated position and the selected vertical set of contacts closed. When this horizontal magnet releases, the horizontal bar and the contact pusher are restored to their normal position and the contacts are opened.

The numbering of the outlets in relation to the operation of the different selector magnets is as follows.

The 100 outlets are arranged in four rows of 25 each, which are numbered 00–24, 25–49, 50–74 and 75–99, respectively.

Each pair of vertical bars, and therefore each of the 25 different combinations of code bar magnets, corresponds to one outlet in each of these four rows; thus the first pair of vertical bars corresponds to the first outlet of each row (00, 25, 50 and 75), the second pair of vertical bars to the second outlet of each row (01, 26, 51 and 76), etc. . . . All of those vertical bars which are lifted by the first vertical servo-magnet correspond to the first two rows of 25 outlets (00–49); those lifted by the second vertical servo-magnet correspond to the last two rows of 25 outlets (50–99). It will be clear from this that by the successive operation of a combination of code bar magnets and one vertical servo-magnet, two outlets will be indicated by the operation of one vertical bar, viz. either one outlet each in rows 1 and 2 or one outlet each in rows 3 and 4.

After an individual horizontal magnet by its operation has indicated the individual selector for which contact has to be established, the corresponding horizontal bar will be moved in one of two directions, depending on which of the horizontal servo-magnets operates. The contact pusher located at the intersection of the operated vertical and horizontal bars will accordingly be moved in one of two directions and thereby establish contact with one of the two outlets indicated by the operated vertical bar. The arrangement of the horizontal servo-magnets is such that the first causes a contact to be closed either in rows 1 or 3, and the second causes a contact to be closed either in rows 2 or 4. Therefore, the first horizontal servo-magnet controls outlets 00–24 and 50–74 and the second controls outlets 25–49 and 75–99.

The following parts of the switch have been shown in the drawings, since these parts are all that are required for a clear understanding of the invention: the code bar magnets, the horizontal bar magnets, the vertical servo-magnets, the horizontal servo-magnets, the main switch contacts closed by the cooperation of these parts, and certain contacts operated by the vertical and horizontal bars.

The control circuit for operating the multi-selector and containing the code bar magnets and the horizontal and vertical servo-magnets is an "electronic selecting and bar operating" circuit and will be conveniently referred to hereafter in the description as an "ESBO" circuit.

The invention will be fully understood from the following description with reference to the accompanying drawings, in which:

Fig. 4 is a diagram of a common control or "ESBO" circuit for a group selector multi-switch comprising a number of individual group selectors, the circuit for one of which is shown in Fig. 3;

Figure 8:
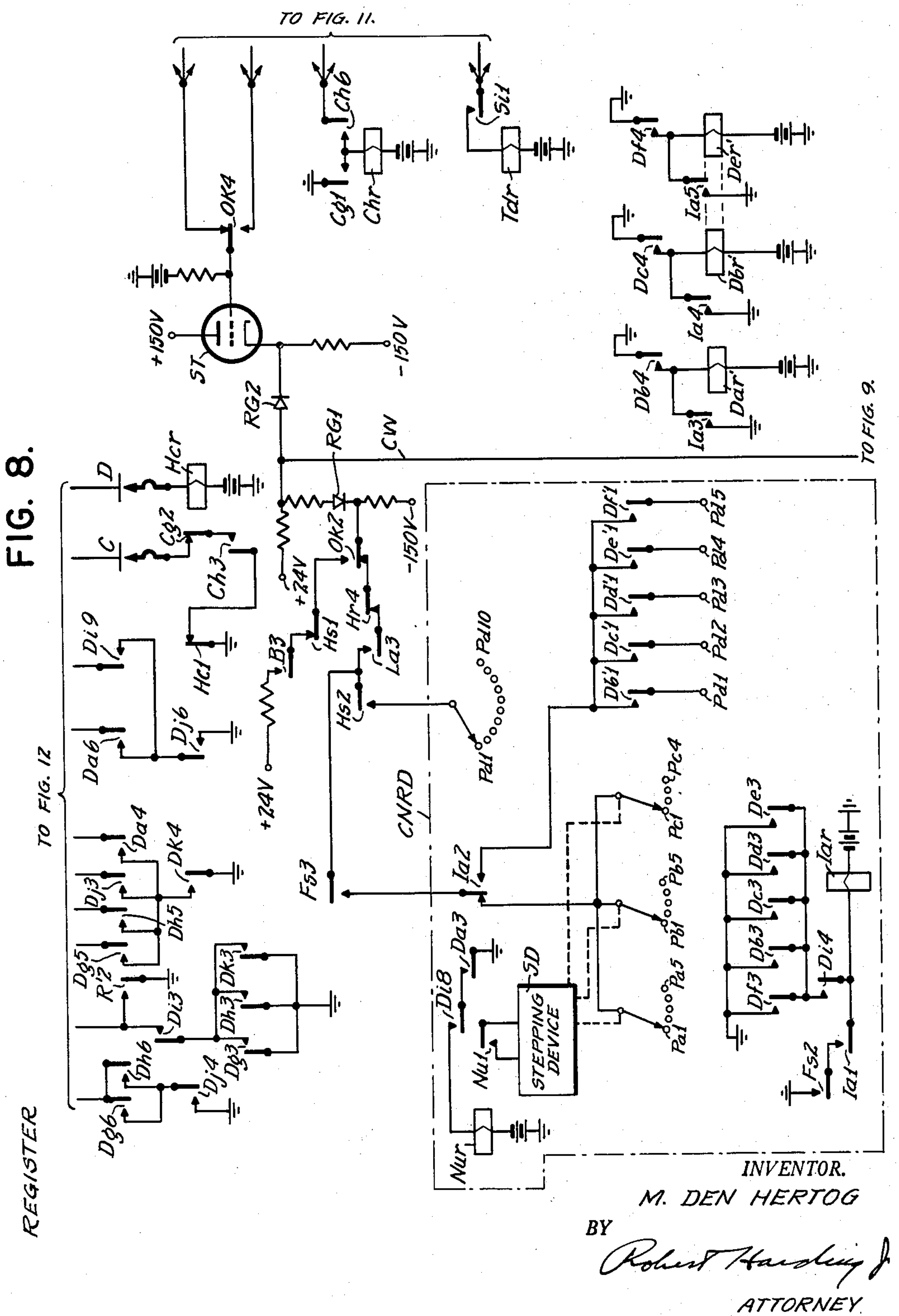
Figure 9:
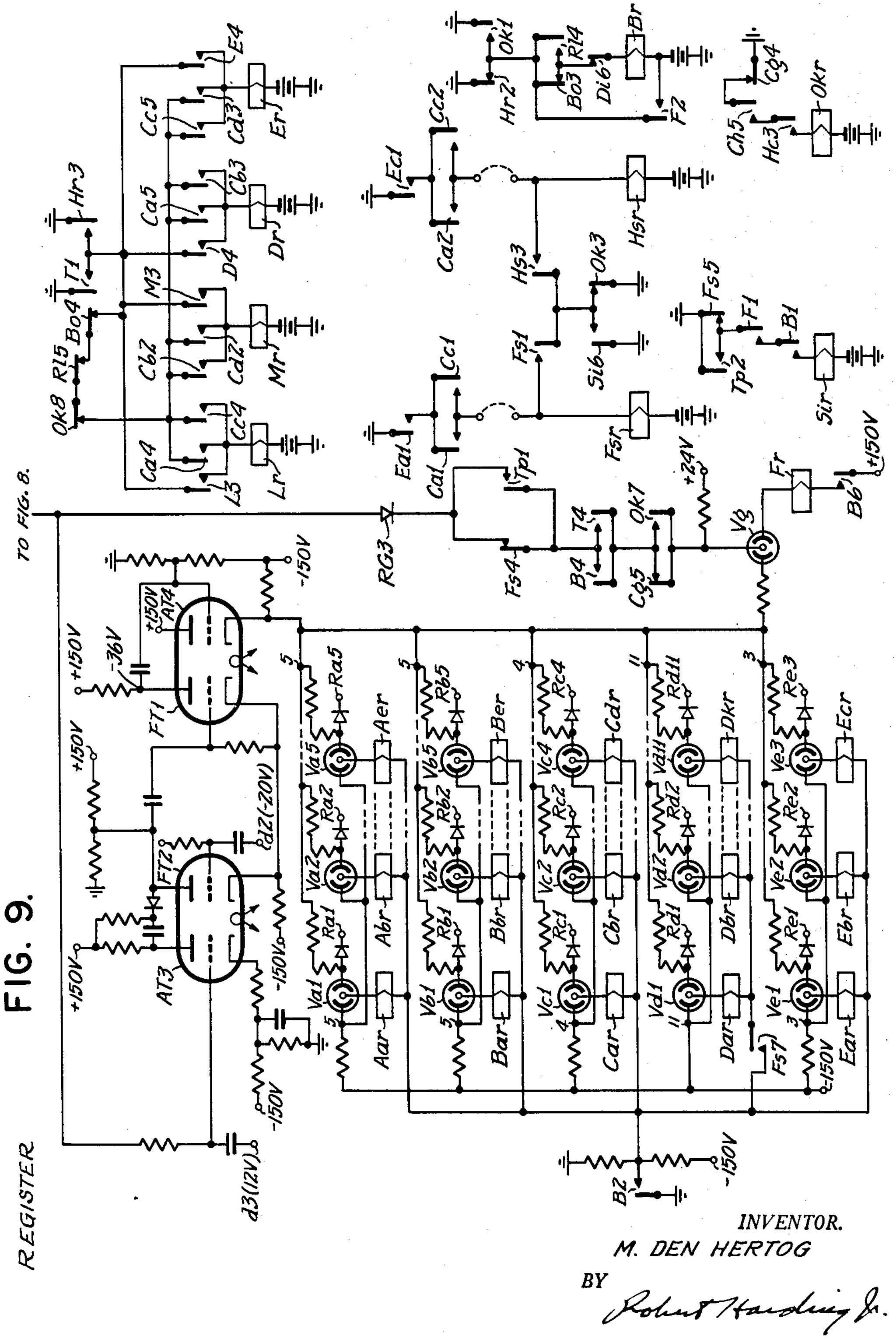
Figure 10:
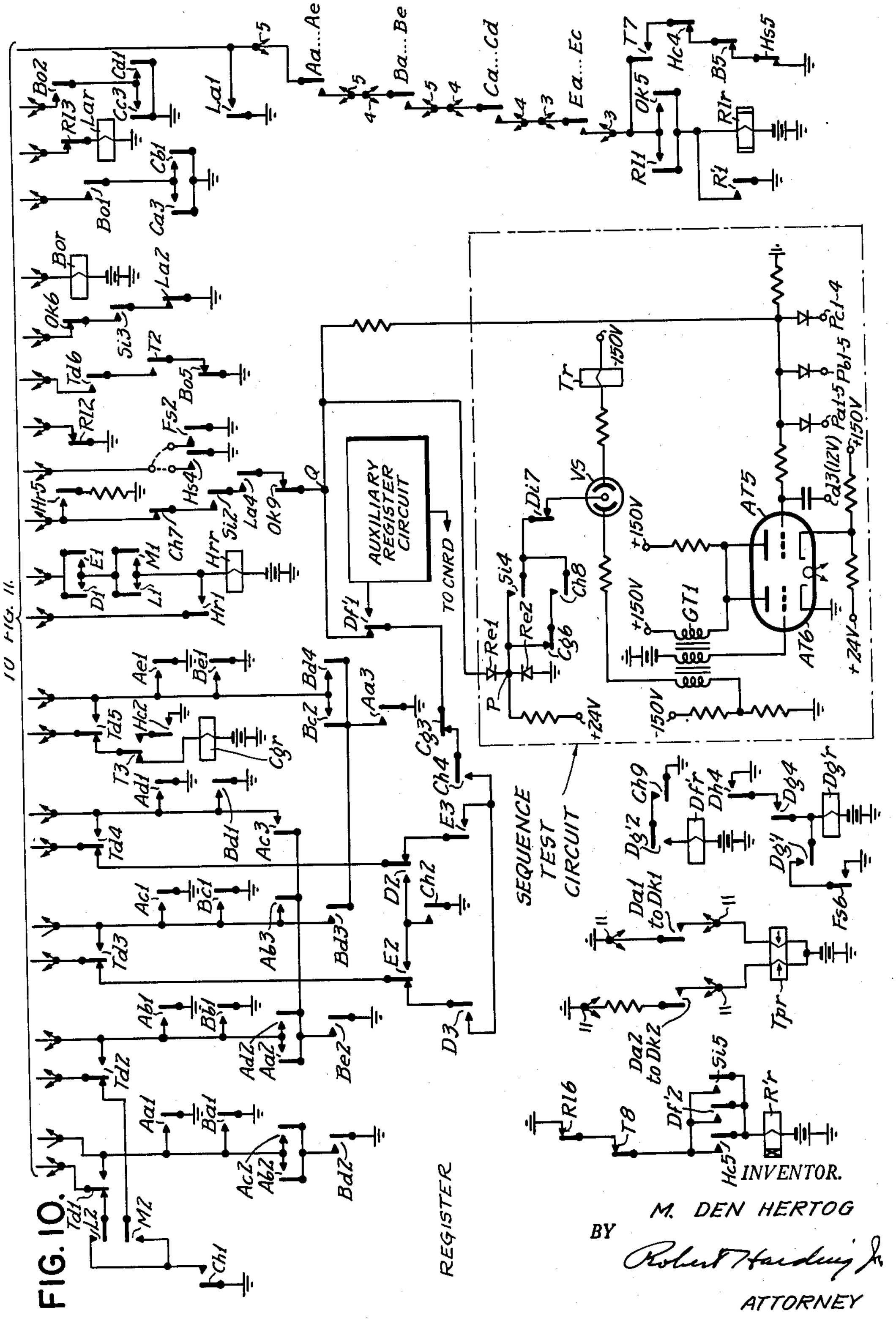
Figure 11:
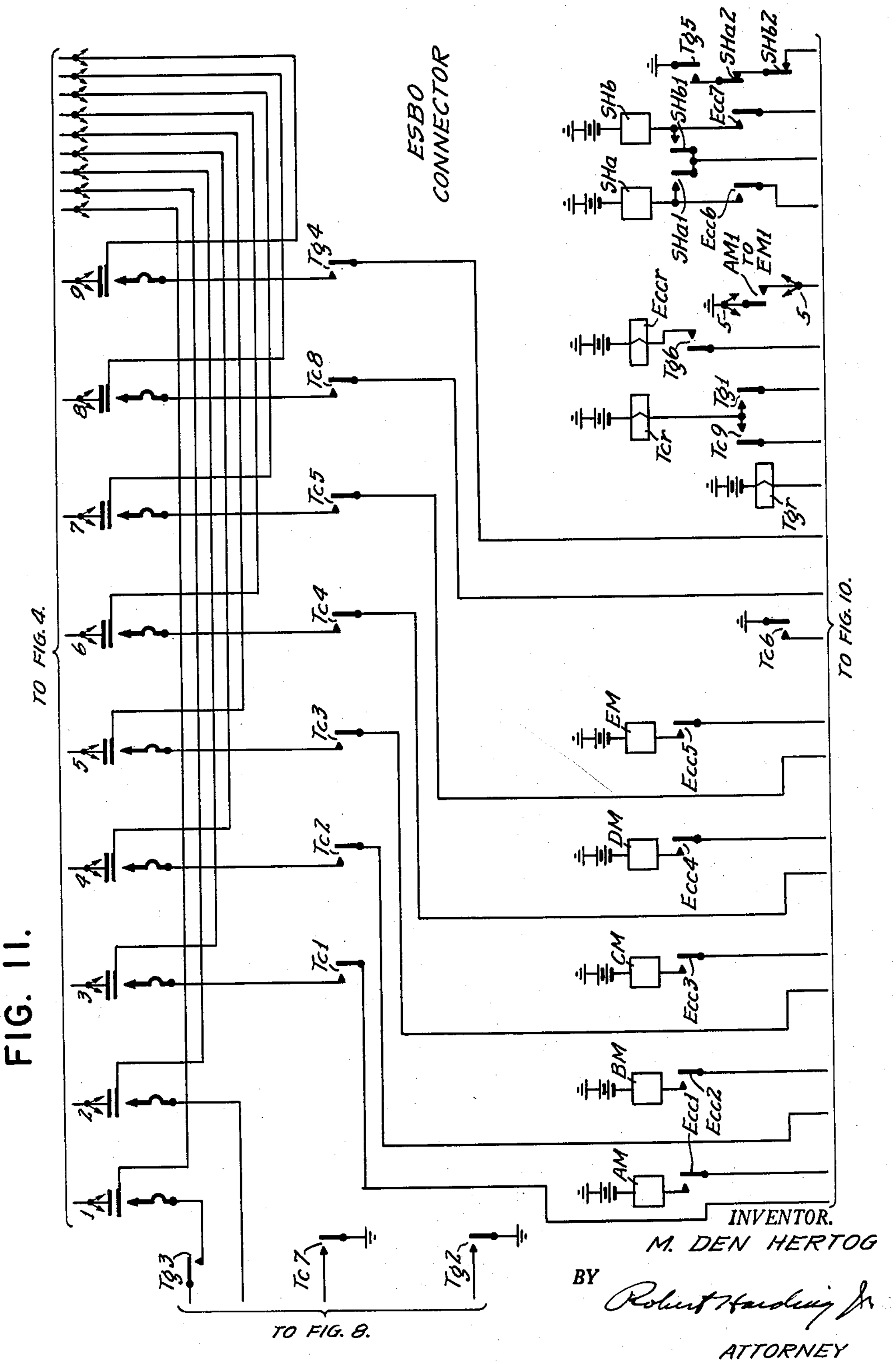
Figure 12:
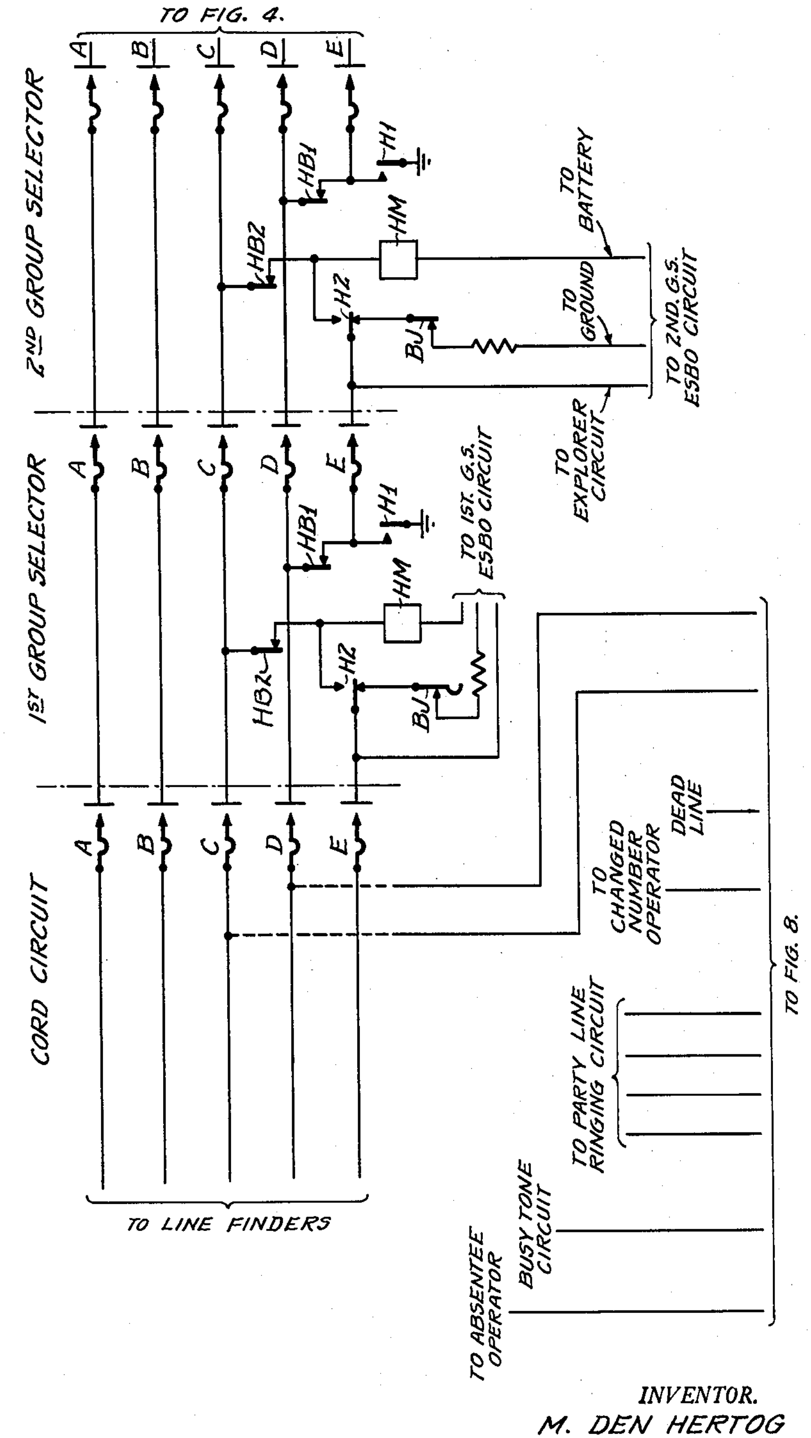
Figure 13:
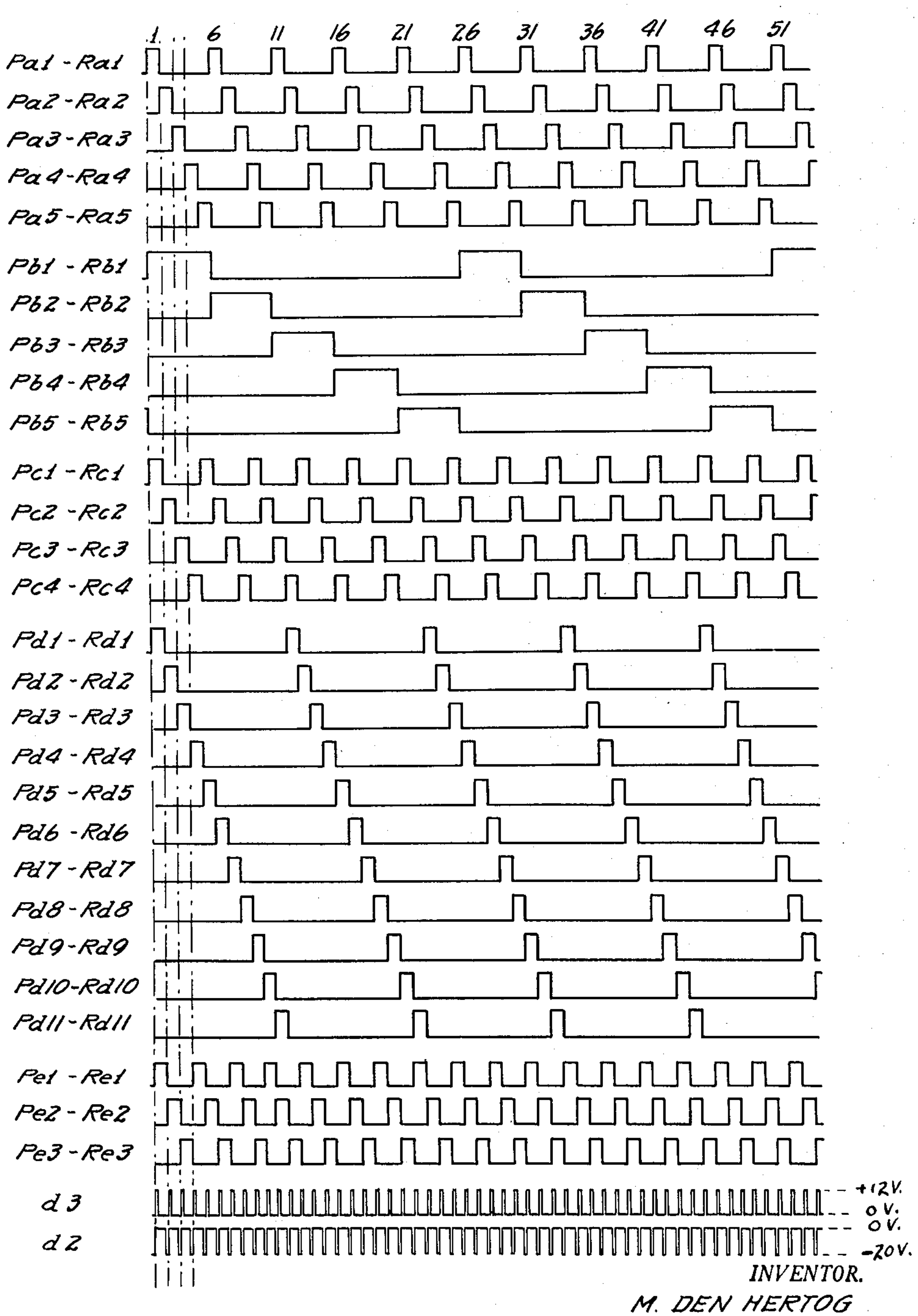
Figure 14:
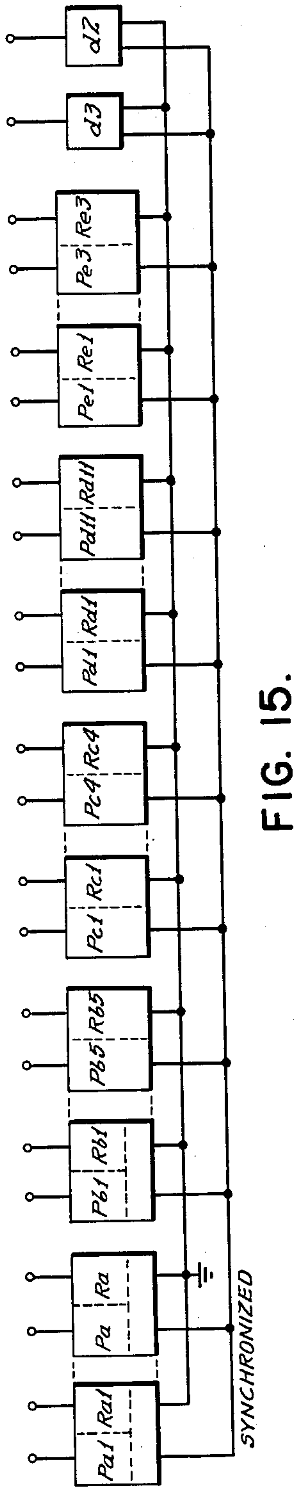
Figure 15:
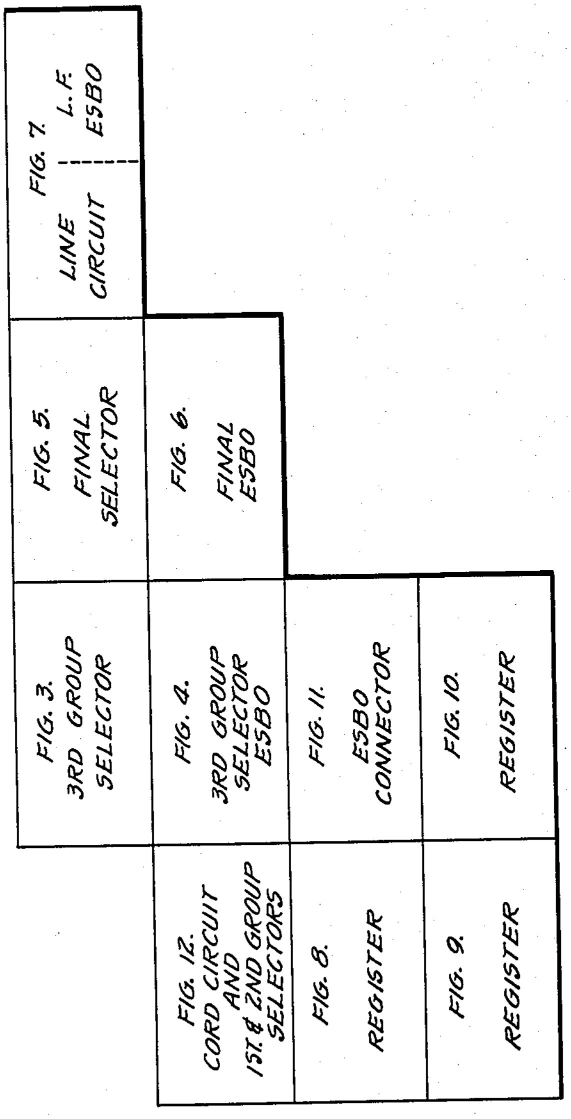

Figs. 8, 9 and 10, placed in the order indicated in Fig. 15, represent a circuit diagram showing sufficient of a register controller circuit for controlling selection in the several selector stages;

Fig. 11 is a diagram of an "ESBO" connector circuit for connecting the register controller with the proper "ESBO" circuit;

Fig. 12 is a diagram of the cord circuit and first and second group selector circuits to illustrate certain connections to the register controller;

Fig. 13 is a diagram of the voltage impulses which are used to control the circuit;

Fig. 14 is a schematic diagram of the impulse sources for producing the controlling impulses; and Fig. 15 is a view showing the arrangement of the various figures to form a complete circuit.

The embodiment shown is a mechanical-electronic switching system employing the above described multi-selectors and having the following operating features:

The register controllers obtain direct and separate access to the "ESBO" circuits at the different finder and selector stages via "ESBO" connectors independent of the conversational connection, and selection is controlled via said direct connections. Certain controlling impulses are transmitted directly from the electronic equipments at the "ESBO" circuits to those at the register circuits via the "ESBO" connectors and need not be transmitted via the conversational train of switches. This removes the possibility of interference on the talking circuits and provides the possibility of using special measures, like screening of the impulse wires, to avoid external influence on these wires.

The identity of a selected outlet is stored in the register and used for controlling the setting of the group and final selectors via the direct access. The individual selector circuits are electrically separated from the common "ESBO" circuit governing each multi-selector, i. e. there are no connections via common wires between the individual selectors and the common "ESBO" circuits, except that the battery potentials required for the operation of the horizontal magnets and for the test potentials, are taken from the fuses provided at the "ESBO" circuits.

By providing a sufficient number of wires between the register circuit and the different "ESBO" circuits required in an exchange, it has been rendered possible, whenever a register controls the operation of one of the selectors associated with an "ESBO" circuit, to control the operation of the switch magnets directly from outlet-identity storage equipment in the register.

The principle of operation permits of energizing the individual horizontal magnet of a selector simultaneously with the operation of the vertical bar magnets, so that the total switching time required for establishing a connection through a multi-switch will be reduced with respect to that of systems heretofore proposed.

An alternative method of signalling from the register to the "ESBO" circuit is also provided, whereby a combination of conditions is sent simultaneously over a number of parallel wires which are now available via the "ESBO" connector.

GENERAL DESCRIPTION

Figure 1:
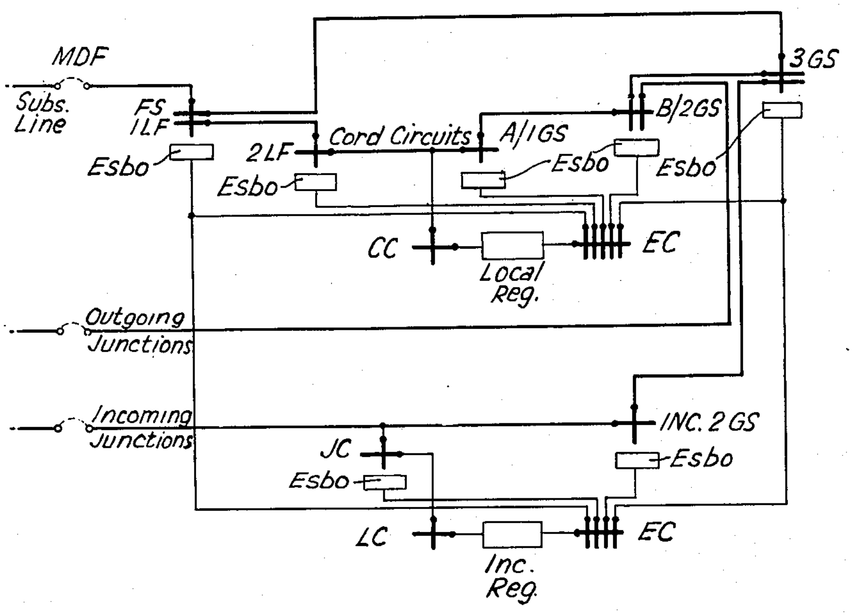
Fig. 1 is a schematic diagram of the junction and selection equipment of an automatic telephone exchange embodying the invention.

Fig. 1 shows the layout of an exchange for a capacity of 10,000 lines. The multi-switches are indicated by a symbol showing the crossing of one or more horizontal and vertical lines, each horizontal line indicating a number of inlets or individual switches, and each vertical line indicating a number of outlets or multiple connections on one or a plurality of multi-switches. For example, the subscriber lines are connected to the outlets of multi-switches which incorporate the first line finders and final selectors. All of these multi-switches are represented by a single symbol of which one horizontal line indicates all first line finders and another horizontal line indicates all final selectors of all line finder and final selector multi-switches provided at the exchange.

Although Fig. 1 shows one symbol to illustrate all multi-selectors of each kind provided in the exchange, it should be understood that, in the case of line finder and final selector multi-switches, for each group of a hundred lines a separate multi-selector is provided, each comprising a number of first line finders and final selectors to handle the traffic for a group of 100 subscriber's lines, as required by traffic conditions.

It will be seen that a call is routed via the first line finders through a second line finder to a cord circuit which, through a cord chooser CC, may be connected to a local register. With each cord circuit is associated a combined "A" and first group selector which is denominated "A/1st GS." A call to a local subscriber is routed via this selector and through three more stages of selection to the called subscriber's line, viz. through a combined "B" and second group selector, denominated "B/2nd GS," a third group selector, "3d GS," and a final selector, "FS."

Outgoing calls are routed via outgoing junctions taken directly from the outlets of the B second group selector. Incoming calls enter on incoming junctions which, via two stages of connecting switches JC and LC, may be connected to an incoming register circuit, and each of which junctions is associated with an incoming second group selector. From the outlets of these incoming group selectors access may be obtained to a called subscriber via a third group selector and a final selector.

Figure 6:
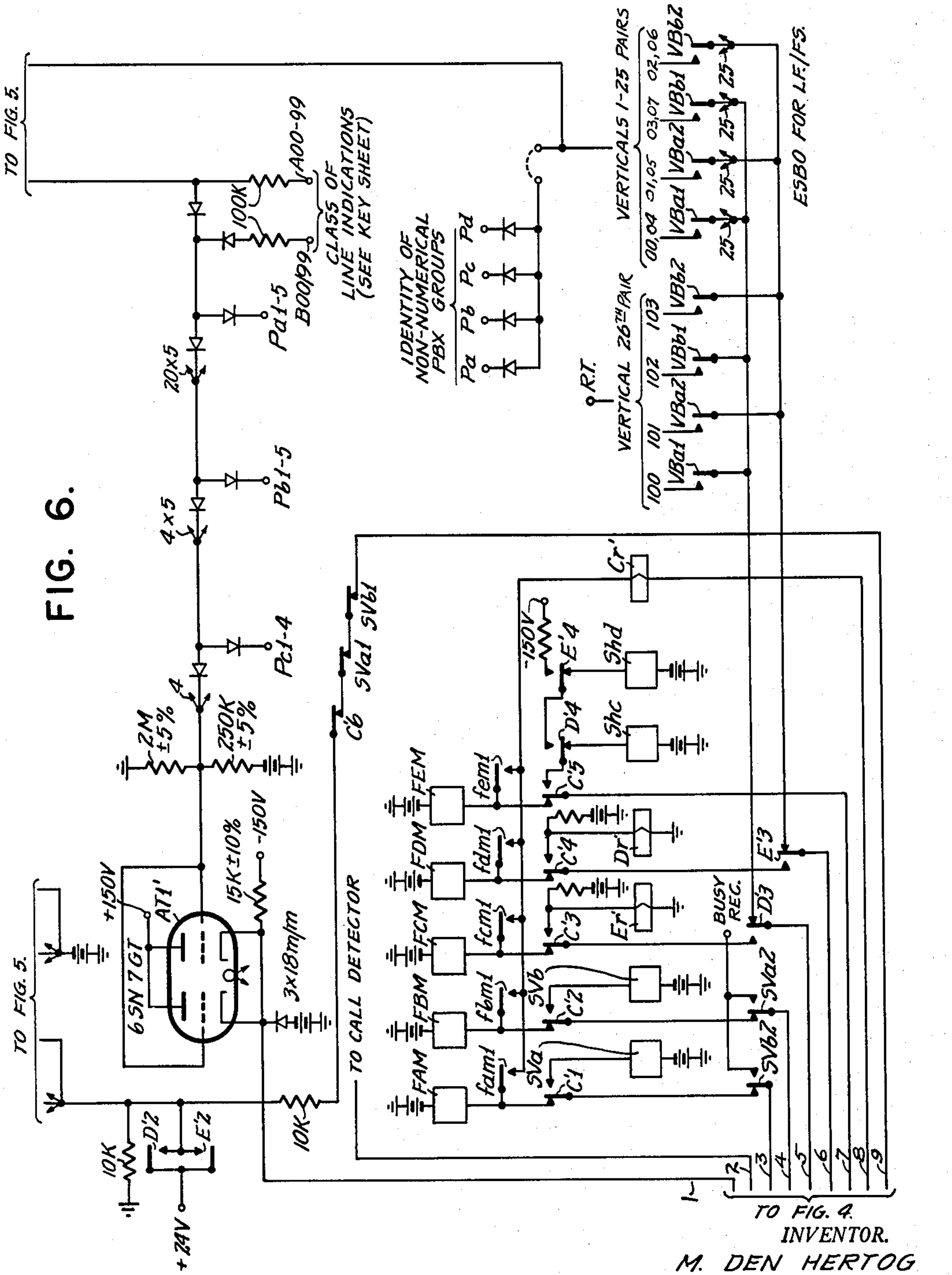
Fig. 6 is a diagram of an "ESBO" circuit for the final selector and first line finder of the exchange of Fig. 1.

Underneath each of the symbols indicating the multi-switches at each stage of selection, is shown a little rectangle, denominated "ESBO." This indicates the common equipment which is provided with each of the multi-selectors provided for the corresponding selecting stage and of which details, by way of example, have been shown in Figs. 6 and 4 for the case of a line finder and final selector "ESBO" circuit and a group selector "ESBO" circuit, respectively.

These "ESBO" circuits may be connected by means of a so-called "ESBO" connector directly to a register circuit, which is to control the setting of an individual switch of the corresponding multi-switch. For this purpose, each of the local and incoming registers is provided with an "ESBO" connector, indicated by the symbol "EC," and of which the outlets provide access from each of these registers to all of the "ESBO" circuits to which access must be obtained. The "ESBO" connectors are multi-switches of which the inlets are associated with the registers and the outlets are multipled for all registers to the "ESBO" circuits. The multi-switches used for these "ESBO" connectors may themselves have "ESBO" circuits, or, alternatively, each individual switch may have completely individual operating and control equipment.

Other means for connecting the registers to the various "ESBO" circuits also fall within the scope of this invention; for example, relays may be employed to the same effect.

The purpose of the "ESBO" connector is to connect a register directly with the "ESBO" circuit of a multi-switch which has an individual selector which must be controlled by the register. It will be seen that for this purpose, the "ESBO" connector of the local registers provide access to the "ESBO" circuits of the multi-switches for first line finders and final selectors, second line finders, "A" first group selectors, "B" second group selectors, and third group selectors, as all of these switching stages are controlled directly from the local registers, in order to establish a connection. On the other hand, the "ESBO" connectors of the incoming registers only provide access to the "ESBO" circuits of the incoming second group selectors, the third group selectors, and of the first line finders and final selectors, these being the only selecting stages on which the incoming registers exercise control. In addition, the "ESBO" connector of the incoming register is connected to the "ESBO" circuits of the junction connecting switches JC which are equally controlled by these registers.

Whenever a register has to control a selection on one of the group selectors, it obtains, previous to this selecting operation, information as to the "ESBO" circuit to which it has to be connected for exercising control of the individual group selector involved. The manner in which this happens will appear later from the description. It will, therefore, be assumed that the register has established a connection via its "ESBO" connector to the particular "ESBO" circuit which controls the group selector on which a through-connection has to be established. Taking, for example, the case in which a selection has to be made on a third group selector from a local register, this local register will have operated its "ESBO" connector, such that it obtains direct access to the "ESBO" circuit associated with the third group selector multi-switch to which the register is already connected in a different way, viz. via the cord chooser CC, and "A" first group selector and a "B" second group selector. It is assumed that the "B" second group selector, as a result of a previous selection, has seized an individual third group selector of the multi-switch in question, and that, by means to be explained afterwards, a signal has been sent to the register to indicate the "ESBO" circuit corresponding to the individual third group selector seized by the "B" second group selector. The register, in accordance with this information, now operates its "ESBO" connector to connect directly with the third group selector "ESBO" circuit involved, and via this direct connection completes all the necessary operations; viz. it selects a free outlet of the wanted direction, it tests this for busy, it determines its class of outlet, etc. and thereupon, again by the direct connection via the "ESBO" connector, it operates those of the switch magnets required to effect through-connection with the selected outlet on the third group selector. Exception is made for the horizontal magnet indicating the individual switch on the third group selector multi-switch, the circuit for which is completed via the conversational train, i. e. the various stages of selectors by which the register has obtained access to this third group selector, as this is the only manner in which the register may have access to the particular individual switch concerned. Upon having thus completed the through-connection on the third group selector considered, the register releases its "ESBO" connector, so that the direct connection with the third group selector "ESBO" is severed.

One of the functions of this "ESBO" circuit, previous to being disconnected, was, however, to signal to the register, directly via the "ESBO" connector, the identity of the "ESBO" circuit in the next switching stage to which the register should now connect, depending on the particular outlet which has been seized by the third group selector. In the case in point this is an "ESBO" circuit for a first line finder and final selector, and according to the signal received, the register will now operate its "ESBO" connector again to effect connection with the "ESBO" circuit of the particular multi-switch of which one of the final selectors has already been engaged by the third group selector.

In Fig. 1, it has been assumed that each register is associated with a single "ESBO" connector, which provides sufficient capacity to obtain direct access to all "ESBO" circuits concerned. This may be possible for small exchanges, without going to a too big capacity of the switch, but in certain cases it may be necessary to split the "ESBO" connector for each register into two or more separate switches, each giving access to a part of the "ESBO" circuits. For reasons of convenience it may be assumed that the "ESBO" connector switches are so constructed that they give access to a maximum of 50 "ESBO" circuits. It has been found that in this case a single "ESBO" connector will suffice for exchanges up to 2500 lines; two "ESBO" connectors each providing a capacity of 50 outlets may be required up to a capacity of 5000 lines, etc. A normal exchange of 10,000 lines will usually require four "ESBO" connectors, each with 50 outlets, for each of the local registers. It will be evident that this number will be smaller for incoming registers which normally require access to fewer "ESBO" circuits.

Figure 2:
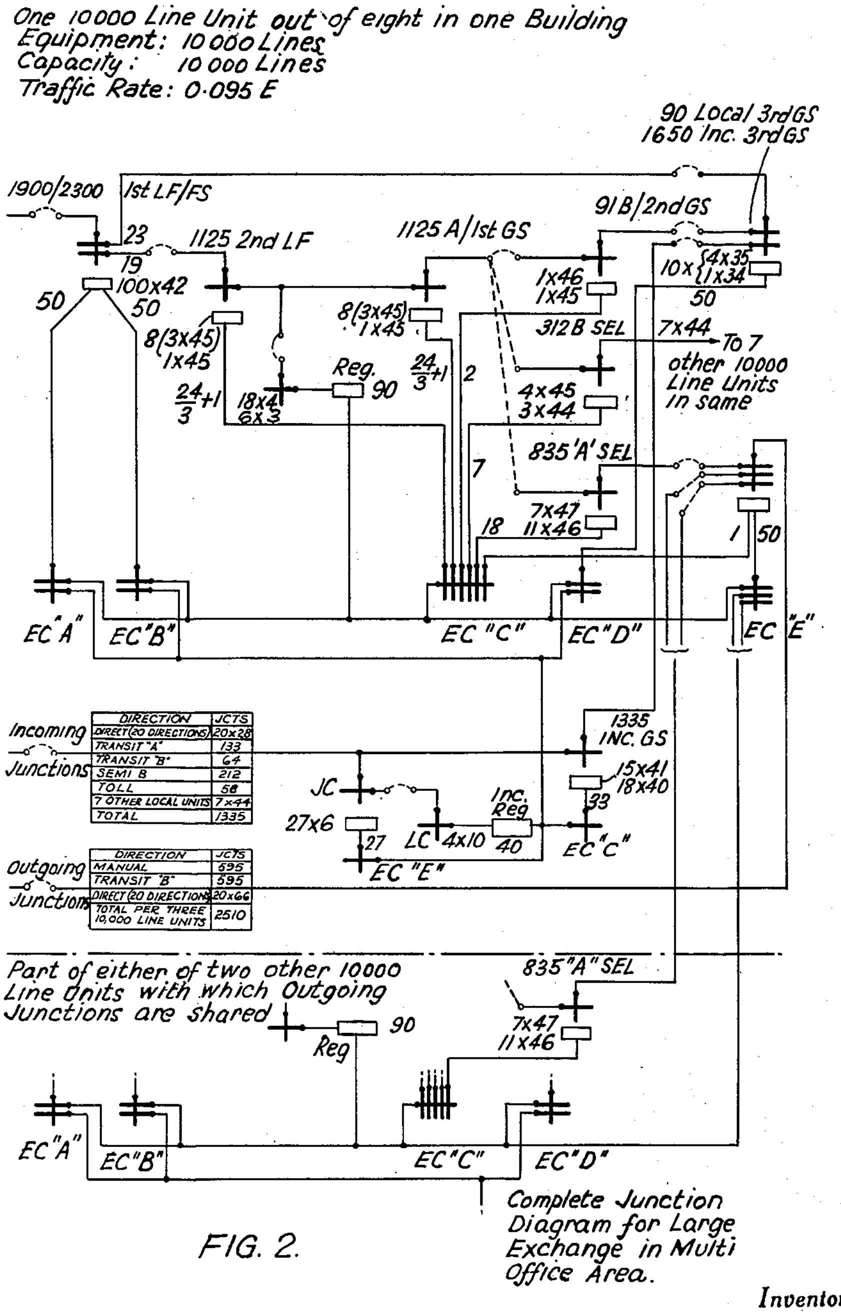
Fig. 2 is a complete junction diagram for a large exchange.

An extreme case has been shown on the junction diagram, Fig. 2, which represents one 10,000 line unit in a multi-office area in which it is supposed that the unit considered is one out of eight similar units, all equipped in one building and of which the traffic rate is extremely high, viz. 9.5 Erlang per hundred lines in the busy hour. This figure shows the number of multi-switches and consequently the number of "ESBO" circuits required in this case.

It will be seen that in order to cater for the outgoing traffic, it has been assumed that the traffic passes via three stages of selectors to the outgoing junctions, of which the last stage has been made common for three of the 10,000-line units, so that the traffic towards the outgoing junctions will be combined for three of these units, by which a considerable economy in the number of these junctions is obtained.

In this extreme case, the number of "ESBO" connectors required for each of the local registers amounts to five, and these five "ESBO" connectors have been denominated "A," "B," "C," "D" and "E," respectively. The manner in which these "ESBO" connectors have been used in connection with the different "ESBO" circuits has been carried out according to a certain plan which permits using the signal, sent to the register to indicate to which "ESBO" it has to connect itself for controlling the next selection, as a class-of-outlet signal which tells the register which selection it has to control next. For this purpose, the different signals which may be transmitted from the "ESBO" circuits to indicate to the register which is the "ESBO" circuit to be connected next, may, for example, be divided into six classes, A to F (shown in the table of Fig. 4), of which the first five correspond with the five "ESBO" connector stages shown in Fig. 2, whereas the sixth, group F, is used to signal the fact that an outgoing junction is connected. This may be further explained as follows:

The signal sent to the register to indicate the next "ESBO" circuit from any of the third group selector "ESBO" circuits, belongs either to class A or B. This is owing to the fact that in a 10,000-line exchange, two "ESBO" connectors are required for the final selectors, each giving access to 50 outlets, to which 50 of the 100 "ESBO" circuits, each serving a group of 100 subscriber lines, are connected. Therefore, in case the called line is connected to one of the first 50 groups of 100 lines (viz. lines numbered 0000 to 4999) the third group selector "ESBO" circuit will send a signal of class A, whereas a signal of class B will be sent to indicate a connection via the "ESBO" connector that provides access to the "ESBO" circuit serving the remaining 50 groups of 100 lines, viz. lines 5000 to 9999. The signals of both classes A and B indicate to the register that the next selection has to be made under the combined control of the tens and units digits received at the register circuit.

The "ESBO" circuits controlling the multi-selectors for the "A" first group selector will send a signal of class C to the local register in order to indicate to this register which "ESBO" circuit to connect for the next switching stage. In the case shown in Fig. 2, this may be any of the "ESBO" circuits serving the "B" second group selectors for local calls, the "B" selectors for calls to other 10,000-line units in the same building, or the "A" selectors for outgoing calls. All of the "ESBO" circuits serving the "B" second group selector multi-selectors are connected to a third "ESBO" connector, and, therefore, the signal sent from the "A" first group selector "ESBO" circuit being of class C, tells the register to connect an "ESBO" circuit via the third "ESBO" connector C. At the same time, by receiving a signal of class C, the register is informed that the selection it has to make is the so-called "last translated selection," i. e. a selection which is made under the control of the translator at the register circuit governed by the combination of exchange designating figures of the called number. This selection is called the "last" translated selection, because if the translator indicates the fact that more than one translated selection has to be made, that required now is the last of the translated selections. If the translator indicates only one translated selection to be made, the last translated selection is evidently identical to this.

The "ESBO" circuits serving the "B" second group selectors transmit a signal to the register to tell the register to which of the "ESBO" circuits serving the third group selectors it has to connect itself. All of the "ESBO" circuits of the third group selectors are connected to a fourth "ESBO" connector, and, accordingly, the signal sent from the "ESBO" circuits of the "B" second group selector is of class D. This not only informs the register to connect an "ESBO" circuit to "ESBO" connector D, but at the same time, the signal of class D informs the register that it has to make the next selection under the control of the hundreds digit.

The "ESBO" circuits of the "A" selectors may also transmit a signal of class E, to inform the register that it has to use a fifth "ESBO" connector E in order to connect to one of the "ESBO" circuits serving "B" outgoing selectors. At the same time the signal of class E has the significance that it causes the register, in the same way as the signals for class C, to control selection from the translator. The reason for this is that the translated selection in the case of outgoing calls is used twice, the first time on the "A" selectors and next on the "B" selectors. These "A" and "B" selectors operate as a two-step selecting stage, and in consequence thereof, the register causes both the "A" and "B" selectors consecutively to search for an indication from the same group of outlets.

The "ESBO" circuits serving the "B" selectors, send a signal of class F. This signal informs the register that for the next selection it must not connect itself to any "ESBO" circuit, but that it should switch over to distant operation. The class F signals comprise several distinct signals each of which indicates a different class of outlet.

One of these signals may be used to indicate a junction to a nearby office and other F signals may be used to indicate calls to distant offices.

When an exchange has either a lower traffic rate or has a smaller capacity, it is possible to concentrate all "ESBO" circuits on a smaller number of "ESBO" connectors. An extreme case is that all "ESBO" circuits are concentrated on a single "ESBO" connector, which, if the capacity of this is 50, evidently means that this can be done only when the total number of "ESBO" circuits to be served from local registers does not exceed 50.

In other cases it may be possible to divide the number of "ESBO" circuits to be connected over 2, 3, or 4 "ESBO" connectors, each with a capacity of 50 outlets. In all these cases, however, the signals that are sent from the "ESBO" circuits may still be of the same six classes, A to F.

The manner in which the "ESBO" circuits are then connected to the different "ESBO" connectors is preferably such that the "ESBO" circuits of one switching stage are all connected to the same "ESBO" connector. This permits the register to use the class indication to direct the call via the proper "ESBO" connector to the next "ESBO" circuit. For example, assuming that in an exchange of a certain size and calling rate it is possible to concentrate the "ESBO" circuits of the "A" first group selectors, the "B" second group selectors, and the third group selectors, all on a third "ESBO" connector C, so that the "ESBO" connector D, Fig. 2, is suppressed, the "ESBO" circuits for the "B" second group selectors will still send a signal of class D to the register to inform the register that the next selection takes place by means of a third group selector "ESBO" circuit. In receiving a signal of class D, however, the register will not attempt to connect via a fourth "ESBO" connector D, because this does not exist, but will use this signal to establish a connection via the third "ESBO" connector instead.

In the case assumed, the receipt of signals of either classes C or D has the same significance to the register, as far as the connection of an "ESBO" circuit at the next switching stage is concerned. However, at the same time, the receipt of a signal of class D tells the register that the next selection is to be controlled by the hundreds digit, as distinct from a signal of class C which also causes the register to establish a connection via "ESBO" connector C, but which signifies the next selection to be controlled by the translator.

In a similar manner the connection of "ESBO" circuits may be further concentrated on fewer "ESBO" connectors whenever the capacity of the exchange or the calling rate will permit to do so, but in each case the signals sent from the "ESBO" circuits of the different switching stages will remain the same as explained in connection with Fig. 2. If a complete switching stage is suppressed, the signal indicating the selection to be made in the succeeding switching stage is now sent from the "ESBO" circuit controlling the preceding switching stage. For example, if in a small exchange the "B" second group selector is suppressed, a signal to the effect that the local third group selector has to be connected is sent by means of a signal of class D from the "ESBO" circuit of the first group selector.

TIME POSITION CONTROL IMPULSES

The control of the equipment is accomplished by means of time positioned voltage impulses, illustrated in Fig. 13. These impulses are produced by sources illustrated in Fig. 14, which are synchronized in such a manner that the time relation of the impulses from the various sources is maintained. The impulses from each source repeat at periodic intervals. The sources are divided into groups, and for convenience each source is referred to with the same nomenclature as the repetitive impulses which it produces.

There are five sources in the first group and the impulses therefrom are denominated P$a$1 . . . P$a$5. Each impulse from any of these sources has an impulse length equal to the duration of one time unit, the impulses from the five sources being staggered by one time unit, and their impulse period being five time units.

The second group also has five sources, the impulses being denominated P$b$1 . . . P$b$5, and each has an impulse length which is equal to and coincides with an impulse period of the impulses P$a$1 . . . P$a$5, so that it includes one complete cycle of impulses from sources P$a$1 . . . P$a$5. The impulse length of these P$b$ impulses is therefore equal to five time units; they are staggered by five time units and consequently their impulse period is twenty-five time units.

The third group has four sources, the impulses being denominated P$c$1 . . . P$c$4, and each has an impulse length of one time unit, the impulses from the different sources being staggered by one time unit and their impulse period being equal to four time units.

A fourth group has eleven sources, the impulses being denominated P$d$1 . . . P$d$11, and each has an impulse length of one time unit, the impulses from these sources being staggered by one time unit and their impulse period being equal to eleven time units.

A fifth group has three sources, the impulses being denominated P$e$1 . . . P$e$3, and each has an impulse length of one time unit, the impulses from the different sources being staggered by one time unit and their impulse period being equal to three time units.

There are two additional sources producing trigger impulses considerably shorter than one time unit. The impulses $d$2 have a period of one time unit and are positioned at the end of a time unit so that the trailing edge of the impulse coincides with the end of the time unit, while the impulses $d$3 also have a period of one time unit but are positioned at the beginning of a time unit, so that the leading edge of the impulse coincides with the beginning of the time unit.

The above described impulses are, for the most part, used in connection with the operation of thermionic tubes and therefore the normal voltage of each source is −40 v., while the voltage rises to −16 v. at the regularly recurring times of the impulses. As will be explained later, however, impulses used in the final selector and line finder stages have a voltage ranging from −40 volts, between impulses, to −16 volts at the time of the impulses. For convenience all of these impulses have been indicated by the same diagram on Fig. 13, but in the circuit diagrams, the impulses which vary from −40 volts to −16 volts are designated with a prime mark, thus P$a'$1, for example.

It is also necessary to operate gaseous discharge tubes with certain impulses having time positions corresponding to the time positions of the above described impulses. Therefore, additional sources are provided normally producing a voltage of −100 volts, while the voltage rises to −50 volts at the regularly recurring times of the impulses. These impulses and the sources producing them are denominated R$a$, R$b$, R$c$, R$d$, R$e$, and since the time positions coincide with those of the P$a$, P$b$, P$c$, P$d$, and P$e$ impulses, the same diagram is provided with both sets of nomenclature.

It will be seen that at any one time unit three of the impulses P$a$, P$b$, and P$c$, one from each of the first three groups, will coincide in time and that there will be one hundred such coincidence times in a complete cycle. Since there are one hundred outlets in a selector multiswitch, these time positions, each representing a coincidence of one each of impulses P$a$, P$b$, and P$c$, may be used to identify the individual outlets.

When the eleven sets of P$d$ impulses are combined with the P$a$, P$b$, and P$c$ impulses, the one hundred time positions referred to above will be repeated eleven times, once for each of the P$d$ sources. The P$d$ impulses may therefore be used to provide an indication of the group to which the outlet belongs.

Similarly, the combination of the three sets of P*e* impulses with the impulses P*a*, P*b*, and P*c*, will cause the one hundred time positions to be repeated three times which will give three hundred time positions which may be used for certain class indication.

The impulses *d*2 and *d*3 are used for triggering purposes in a manner to be later described. The impulse *d*2 is negative and varies between a normal 0 volts and −20 volts at the time of the impulse. The impulse *d*3 is positive and varies between a normal 0 volt and +12 volts at the time of the impulse.

SUBSCRIBER'S LINE CIRCUIT

Figure 7:
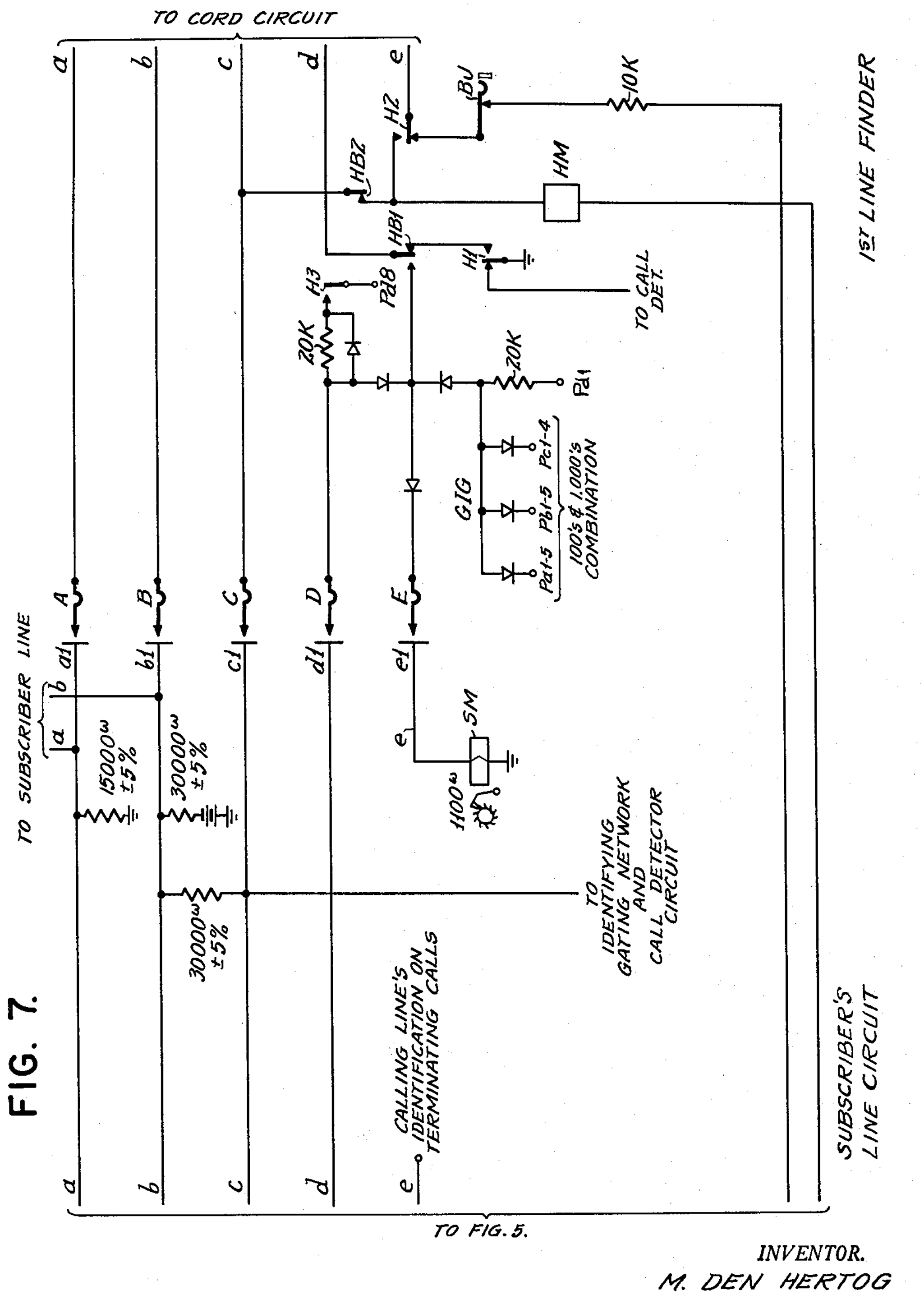
Fig. 7 is a diagram of a subscriber's line circuit.

Th subscriber's line circuit is shown in Fig. 7 and consists of five wires, *a*, *b*, *c*, *d*, and *e*, the subscriber's line being connected between wires *a* and *b*. Wire *a* is connected to ground through a 15000 ohm resistor; wire *b* is connected to the negative terminal of the 48 volt battery through a 30,000 ohm resistor; wire *c* is connected to wire *b* by means of a 30,000 ohm resistor. The four wires *a*, *b*, *c*, and *d* are connected to corresponding four wires *a*1, *b*1, *c*1, and *d*1 in both the first line finder (Fig. 7) and the final selector (Fig. 5) associated with the particular subscriber's circuit. Wire *e* is split, one part being connected to wire *e*1 of the final selector. The part of wire *e* connected to the line finder is connected in the line circuit to a meter SM, the other terminal of which is grounded. The other part of wire *e* is used for certain identification purposes and is connected to a circuit which has not been shown since it forms no part of the present invention.

The wire *c* of the line circuit is also connected to an identification network which network leads to a call detector (not shown) and comes into use when the line is calling. It forms no part of the present invention.

CONTACTS OF MULTI-SELECTORS

It will be seen that the line circuit has five wires and hence the multi-selector used for each selecting stage has its outlets arranged in sets of five, there being one hundred of these sets of outlets in each selector.

The "ESBO" connector circuits utilize the same type of multi-switch as the selectors and therefore the same number and arrangement of contacts are provided. However, it is necessary to have a set of ten contacts for completing the connection to an "ESBO" circuit. Therefore, instead of a hundred sets of five contacts, fifty sets of ten contacts each are used in the "ESBO" connections. Because of this fact, vertical servo magnets are not required, and the operation of one or more code bars in the "ESBO" connector circuit will lift the corresponding vertical bar in preparation for the connection of all ten of the corresponding set of outlets.

DESIGNATION OF RELAYS

Throughout the various circuits relays have been designated by an upper case letter sometimes followed by one or more lower case letters and the letter "*r*", e. g. B*r*. S*ir*. The contact of these relays are not shown adjacent the respective relays, but are shown in the circuits which they control, (thus economizing in space and making the control circuits easier to follow), and are designated by the letters of the relay followed by the number of contact, e. g. B1, S*i*4. Where a group of associated relays or other element is provided, e. g. relays A*ar*, A*br*, A*cr*, A*dr*, A*er*, the first, second, and last are shown with dotted lines between the second and last indicating that some are omitted.

DETAIL DESCRIPTION

For the purpose of explaining the invention it will be assumed that a call has been initiated, a register (Figs. 8, 9 and 10) has been seized and connected to the calling line through a cord circuit, the called number has been registered in the register, and the register has caused the connection to the cord circuit of a third group selector (Fig. 4) through first and second group selectors (indicated in Fig. 12). The wires labelled C and D in the register (upper center of Fig. 8) are therefore directly connected through the cord circuit (Fig. 12) and the first and second group selectors to the inlet wires C and *d* of the third group selector (Fig. 7).

Figure 5:
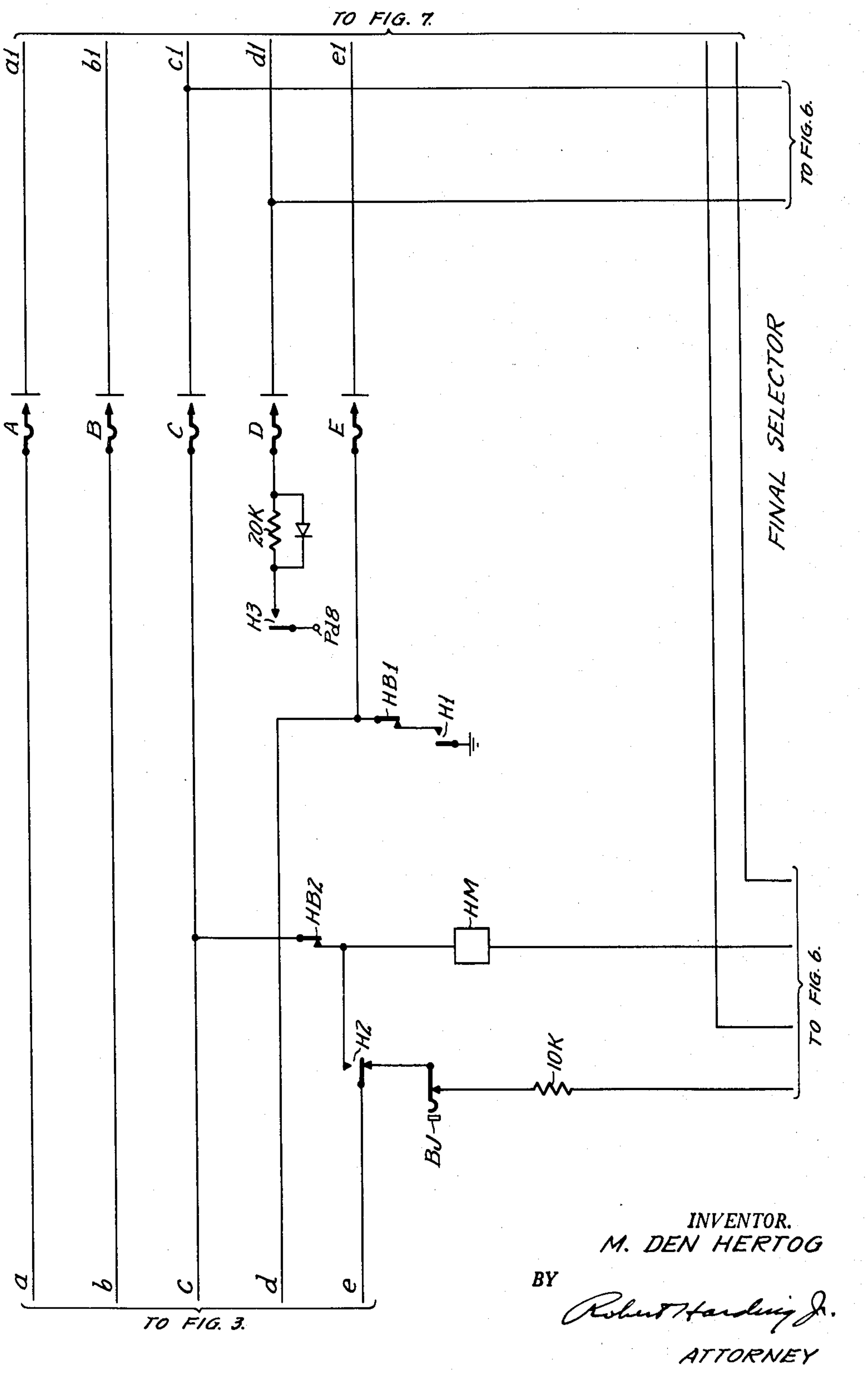
Fig. 5 is a diagram of a final selector circuit for the exchange of Fig. 1.

As a result of the functions of the "ESBO" circuit associated with the group selector preceding this third group selector, a signal was sent to the register identifying the "ESBO" circuit (Fig. 11) which is associated with the third group selector engaged by the preceding group selector. As a consequence of this signal, it is assumed that the register has established connection directly with this third group selector "ESBO" circuit via the "ESBO" connector of Fig. 11. The manner in which the functioning of this "ESBO" connector takes place will be described afterwards in conjunction with a similar operation controlled from the third group selector "ESBO," the "ESBO" connector being then required to connect the register to the "ESBO" circuit (Fig. 6) of a final selector (Fig. 5).

The register (Figs. 8, 9 and 10) is connected by nine wires (Fig. 10) to the "ESBO" circuit (Fig. 4) via contacts of the "ESBO" connector D which are denominated 1 . . 9 and which are assumed to be closed when the operation, now to be explained, commences.

OPERATION OF THIRD GROUP SELECTOR

The actual selection operation commences only when the digital figure indicating the selection to be made has been received at the register circuit. In the case in point this is the hundreds digit which controls the operation of the third group selector.

At the start of this operation one of the horizontal servo magnets SH*a* or SH*b* in the "ESBO" connector (Fig. 11) has been locked in the operated position over break contact R*l*3 in a manner which will be clear later on, since the process is similar for each selecting stage. Relay L*ar* in the register (Fig. 10) has also operated in the locking circuit of the operated horizontal servo magnet. Relay B*r* in the register has also operated over break contact B*o*3, break contact H*r*2, and ground. Because of the prior operation of relays C*ar* or C*cr* and E*cr* under control of the registered hundreds digit, the hundreds selector relay H*sr* has operated and locked over make contact H*s*3, break contact O*k*3, and ground.

Relay T*gr* in the "ESBO" connector (Fig. 11) now operates over make contact H*s*4. This is the relay that keeps a record of the fact that the register has to connect itself via a particular "ESBO" connector to the "ESBO" circuit for the third group selectors and which closes the connection, via two make contacts T*g*3, 4 for wires 1 and 9 to this "ESBO" circuit and holds the "ESBO" connector operated. The operated one of the servo magnets SH*a* or SH*b* of this "ESBO" connector holds the contacts of the "ESBO" connector closed to wires 1 to 9.

The operated condition of relay H*sr* and L*ar* closes a circuit from the called number digit registering device CNRD (Fig. 8) for the marking circuit of the hundreds digit from one of the sources P*d*1 . . . 10 selected by the hundreds recording relays, in a manner not indicated on the drawing, via make contact H*s*2, make contact L*a*3, break contact H*r*4, and break contact O*k*2. This circuit is extended via contacts H*r*4 and O*k*2 to a gate circuit RG1, RG2, forming part of the comparator circuit. The impulses provided from the impulse source connected are characteristic in time position for the hundreds group to be selected and the potentials provided are such that normally ground potential is present, but at recurring intervals impulses at +16 volts are provided. These potentials will, therefore, be present at the lower side of the gate rectifier RG1 from the moment the source in question is connected.

Figure 3:
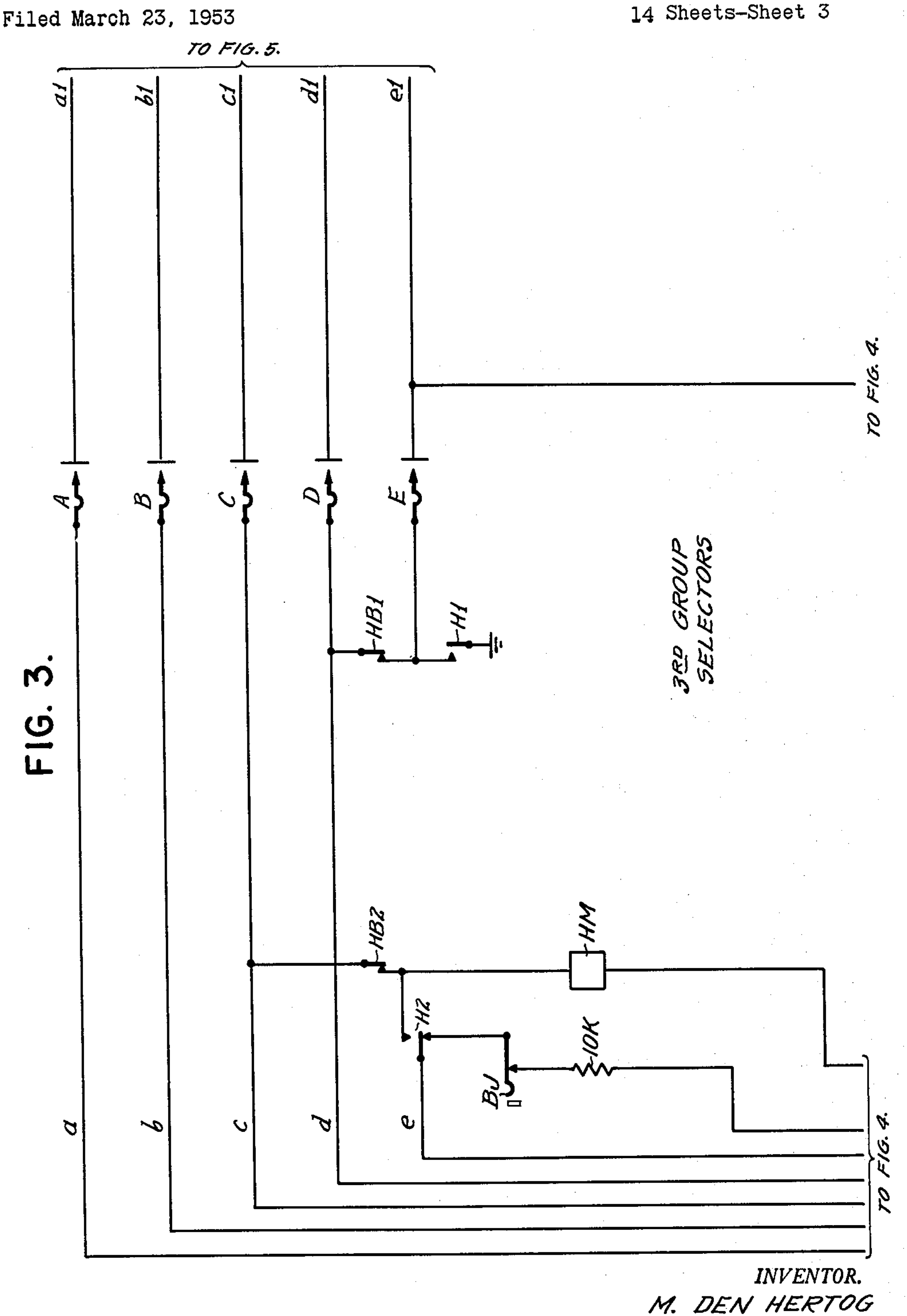
Fig. 3 is a diagram of an individual third group selector circuit for the exchange of Fig. 1.

With reference to Figs. 3 and 4, the test lead *e*1 (Fig. 3), of each outlet of the third group selector is connected via a resistance of 100,000 ohms (Fig. 4) to an explorer circuit comprising a number of gates and decoupling rectifiers, such as represented by the upper horizontal line in Fig. 4. This explorer circuit is controlled via three sets of gates by sources P*a*1 . . . 5, P*b*1 . . . 5 and P*c*1 . . . 4, which, as has already been explained, together provide one hundred different time units. The three pulse cycles of these having periods of 5, 25, and 4 units, respectively, are that for any selection of one pulse from each cycle, the said pulses will only coincide in one unit time position in a cycle of 25×4=100 time positions.

The group of 11 sources, denominated P*d*1 . . . 11, is used for making the different group of outlets at the group selector "ESBO" circuit in a manner to be later described.

Since there are one hundred outlets on the group selector switch, there will be one hundred test leads to the "ESBO" circuit and one hundred 100,000 ohm resistors. These are arranged in twenty groups of five each, indicated by the expression "20×5." The resistors of each group are each connected through a decoupling rectifier to a first common point 1*p*, to which are attached multiplying arrows, there being twenty of these first common points. Between each rectifier and the associated resistor is a rectifier gate to which is applied the impulses from one of the P*a* sources. Thus, the five gates in each group will have impulses P*a*1 to P*a*5 applied respectively to them.

The first common points 1*p* of which there are twenty are divided into four groups, each group having five of these common points, indicated by the expression "4×5," and the common points of each group are in turn connected through individual decoupling rectifiers to a second common point 2*p* of which there are four. Each of the first common points 1*p* has a rectifier gate connected to it to which is applied the impulses from one of the P*b* sources. Thus, the five gates in each of the twenty groups will have impulses P*b*1 to P*b*5 applied respectively to them.

The second common points 2*p* form one group of four, indicated by "4," and are connected to a signal third common point 3*p* through appropriate decoupling rectifiers. Each of the second common points 2*p* has a rectifier gate connected to it to which is applied impulses from one of the P*c* sources. Thus the four second common gates have impulses P*c*1 to P*c*4 respectively applied to them.

The third common point 3*p* is connected to ground through a 200,000 ohm resistor and also to the grid of electron tube AT1.

If a position potential appears on an outlet, it cannot reach the grid of tube AT1 unless the gating rectifiers associated with that outlet are blocked by impulses simultaneously applied thereto, because any one of these gating rectifiers will provide a path to ground through the connected source if an impulse is not present thereon and the potential is absorbed in the outlet resistor.

Each of the 100,000 ohm resistors in the test leads of the outlets is connected via a rectifier gate to one of the terminals A00 to 99 corresponding to it, as represented in Fig. 4, and each of these terminals may be cross-connected, as required, to any one of the sources P*d*1 . . . 11 to indicate to which group of outlets the corresponding outlet belongs.

The result of the above arrangement is that the pulse connections P*a*, P*b*, P*c* to each outlet will attempt to produce a positive impulse on the grid of the amplifying tube AT1, in one time unit in each successive group of a hundred time units, subject to the connection of the sources P*d*1 . . . 11 which absorb any impulse that may be produced under the control of the other gate in ten out of eleven consecutive time units. The result of this is that for each particular outlet one impulse will be produced only once in each cycle comprising 100×11=1100 consecutive time units, and this impulse, by its time position, is characteristic both for the identity of the outlet and for the group number which has been allotted to this outlet. There will thus be an impulse representative of each free outlet.

The impulses supplied to the grid of tube AT1 are transmitted by this tube, which is connected as a cathode follower, to wire No. 1, which leads via the "ESBO" connector (Fig. 11) to the register circuit, Fig. 8. The purpose of the tube AT1 is to provide a low impedance for this impulse circuit, so that the impulses will be less subject to distortion and to interference in the relatively long connection between the "ESBO" circuit and the register.

At the register, (Fig. 8) wire No. 1 is connected, via a make contact Tg3 of relay *tgr* and a break contact O*k*4 of relay *okr*, to the grid of a decoupling tube ST, which is connected as a cathode follower, so that the impulses supplied to this grid are reproduced on the cathode. From the cathode the impulses are effectively delivered via rectifier RG2 to the comparator circuit, the operation of which will now be explained.

If an impulse on the cathode of tube ST does not coincide with an impulse supplied from one of the P*d* sources, the coincidence wire C*w* is maintained at ground potential. The P*d* source which is connected to the comparator (via H*s*2, L*a*3 and O*k*2, see above) is that one which corresponds to the called subscriber's hundreds digit and is connected to H*s*2 under control of the hundreds digit storage device. If the impulse on the cathode of ST does not coincide with the P*d* pulse so connected to RG1, the connection to RG1 is at earth, and hence the coincidence wire C*w* is maintained at or near earth potential. In this case, of course, the cathode of ST is more positive than C*w*, so RG2 is non-conducting.

On the other hand, if there is no impulse on the cathode of ST when the P*d* source connected to RG1 delivers an impulse, the wire C*w* is still held at or below earth potential by current flow through the 60,000 ohm resistance and RG2 to the cathode of ST. In this case RG1 is non-conducting, as the P*d* impulse connected thereto is positive with respect to the potential of the C*w* wire.

Only when the impulse arriving from the decoupling tube ST coincides with an impulse arriving from the source P*d* connected at the register, will the coincidence wire be able to assume a relatively positive potential, and this potential is now transmitted to a grid circuit of another amplifying tube AT3 over a 400,000 ohm resistor.

This grid circuit is also connected via a condenser of small capacity to the impulse source *d*3 which, as has been explained, provides a positive impulse of very short duration at the commencement of each time unit.

The first impulse arriving from the coincidence wire will charge this condenser via the 400,000 ohm resistor with which it is connected in series, but the potential which is thereby transmitted to the grid of the tube is insufficient to cause any further reaction. When, however, at the commencement of the next time unit the impulse arrives from source *d*3, the charge of the condenser has not yet disappeared, and because of this, the pulse from D3 suddenly raises the grid wire to a sufficient positive potential, to cause tube AT3 to function and to transmit a negative impulse of short duration from its anode circuit to the grid circuit of tube FT1. Tube FT1, together with tube FT2, works in a so-called flip-flop circuit and tube FT1 is normally in the conductive condition, whereas tube FT2 normally is non-conductive. By the arrival of a negative impulse on the grid of FT1, the condition of these two tubes reverses, so that FT2 becomes conductive.

The anode of FT1, which originally was at approximately −36 volts, now suddenly changes to +24 volts, so that an impulse of approximately 60 volts is transmitted via the anode condenser to the grid of tube AT4. This tube is also connected as a cathode follower, so that the cathode of this tube becomes 60 volts more positive and thereby applies a potential to the control electrodes of a number of cold cathode tubes of a sufficient value to cause these tubes to ionize. The time during which tube FT2 remains in the conductive condition is limited by the fact that its grid is connected via a condenser to the negative impulse source *d2*. This source, as has been explained, provides a negative impulse of very short duration towards the end of each time unit, so that at the end of the time unit during which FT2 became conductive, a negative impulse will be supplied to its grid by *d2* which causes the flip-flop circuit again to reverse to its original condition. Thus the impulse representing a first free outlet of the desired group has been amplified and delayed by one time unit. As a result of the flip-flop reversal the potential on the anode of F*t*1 changes again to −36 volts and a negative impulse is supplied to the grid of AT4, which interrupts the positive impulse to the control electrodes of the cold cathode tubes.

The cold cathode tubes are arranged in five groups: V*a*1 . . . 5, V*b*1 . . . 5, V*c*1 . . . 4, VD1–11, and V*e*1 . . . 3. Each tube of each group is controlled by a different impulse source, tubes V*a*1 . . . 5 being controlled, respectively, by sources R*a*1 . . . 5, tubes V*b*1 . . . 5 being controlled, respectively, by sources R*b*1 . . . 5, etc. Each source is connected to the trigger circuit of the appropriate tube via a rectifier. As has been already explained, the R impulses are identical in time to the P impulses but the voltage level is from −100 volts at no pulse to −50 volts at the time of the impulse. A tube can only fire on the coincidence of an output from its controlling source and an output from the cathode of tube AT4, in much the same manner as already described in connection with the gating circuit connected to the tube AT1 in the "ESBO" circuit of Fig. 4.

Furthermore, because of a 3,000 ohm resistance in the common cathode circuit of each group of tubes, except that of V*d*1 . . . 11, when one tube in the group has fired, the cathode voltage is automatically raised on the other tubes of the group sufficiently to prevent them from firing. The Vd tubes are not so arranged because two of them are required to be operated in the final selection stage, as will be later described.

There is also another cold cathode tube V*g* which is not controlled by any impulse source, but operates whenever an impulse is received from the cathode of tube AT4.

Each of the cold cathode tubes is provided with a slave relay in the anode-cathode circuit thereof. Thus tubes V*a*1 to 5 are associated with slave relays A*ar*, A*br*, A*cr*, A*dr*, and A*er*; tubes V*b*1 to 5 are associated with slave relays B*ar*, B*br*, B*cr*, B*dr*, and B*er*; tubes V*c*1 to 4 are associated with slave relays C*ar*, C*br*, C*cr*, and C*dr*; tubes V*d*1 to 11 are associated with slave relays D*ar*, D*br*, D*cr*, D*dr*, D*er*, D*fr*, D*gr*, D*hr*, D*ir*, D*jr* and D*kr*; tubes V*e*1 to 3 are associated with slave relays E*ar* E*br*, and E*cr*; and tube V*g* is associated with slave relay F*r*.

At the time the first impulse is delivered from the cathode of tube AT4, representing the first free outlet in the desired group, all of the cold cathode tubes mentioned above, with the exception of tubes V*d*1 to 11, have their anode circuits connected to ground over make contact B2. The anode circuits of the V*d* tubes are open at make contact F*s*7. The cathode circuit of tube V*g* is connected to −150 volts over make contact B6. The first impulse received from the cathode of tube AT4, therefore, will fire one tube in each of the first three groups, the tube fired depending on the particular time position of that impulse. One of tubes V*e*1 to 3 will also fire but this has no effect at this time.

In response to the first impulse, one of each of these first three groups of tubes will ionize in accordance with the source which is connected to its control electrode. The combination of tubes ionized provides information concerning the identity of the outlet which supplied a positive impulse coinciding with the marker impulses at the register, and which therefore belongs to the wanted group.

By the action of the impulse sources *d3* and *d2*, as explained above, the impulse which arrives on the control electrodes of the cold cathode tubes falls in the time unit following that in which the impulse was supplied from the outlet. The contacts of the slave relays are so connected in the control circuits as to compensate for this delay of one time unit with which the impulse is recorded.

Simultaneously with the operation of the cold cathode tubes referred to above, the other cold cathode tube V*g* ionizes, since its control electrode is also connected to the cathode of tube AT4. The negative potential so produced at the anode of V*g* is applied via break contact C*g*5, make contact B4, and break contact F*s*4 to a gate RG3, which gate conducts and so influences the potential on the coincidence wire C*w* that any further impulses that might still arrive on this wire will be absorbed and will no longer affect the impulse-receiving equipment comprising tubes AT3, AT4, FT1, FT2 and the cold cathode tubes. Those of the cold cathode tubes of the first three groups which ionize, cause the operation of their anode slave relays, and these relays, by the combination in which they are energized, record the identity of the selected outlet of the wanted group.

Relay F*r* operates in series with the cathode circuit of tube V*g*, and via its make contact F1, break contact F*s*5, and make contact B1 now completes a circuit for the operation of relay S*ir*. This in its turn, via make contacts S*i*1 and T*g*2, completes a circuit for the operation of relay T*dr*, which on its changeover contacts T*d*1 . . . 5 prepares circuits for wires 3, 4, 5, 6 and 7 of the third group selector "ESBO" circuit, via which the code bar magnets at this "ESBO" circuit will be operated, as described later.

At make contact S*i*2, (Fig. 10), a circuit is closed now in order to permit an electronic sequence test arrangement to test for the presence of free test potential via wire 9 at the third group selector "ESBO" circuit. This test potential is provided in the "ESBO" circuit, when free, i. e. when no other registers are engaged in effecting a through-connection on the multi-switch, from a potential of +24 volts via either of make contacts D*l*2 or E*l*2 (Fig. 4), break contacts C6, SV*a*1, SV*b*1 and a 10,000 ohm resistor to wire 9. This is extended via make contact T*g*4 (Fig. 11), break contact *ch*7, make contacts S*i*2, L*a*4, break contact O*k*9, 100,000 ohm resistance, to the electronic sequence test arrangement (Fig. 10), which is so designed that each register can test on the test potential provided from the "ESBO" circuit only in its own characteristic time, and of which a successful test reduces the potential prevailing on wire 9 to such a value that no further registers can test successfully, so long as this condition continues.

The operation of the electronic sequence test arrangement will now be described in detail. From make contact S*i*2, and via make contact L*a*4 and break contact O*k*9, the test connection extends to the grid of tube AT5 via a potentiometer arrangement including a resistance of 100,000 ohms and one of 300,000 ohms. This grid is further controlled by three gates which are connected to the junction point of said resistances. A grid resistor of 400,000 ohms is inserted between this junction point and the grid of tube AT5. The three gates respectively include rectifiers which are connected to a combination of pulse sources P*a*1 . . . 5, P*b*1 . . . 5 and P*c*1 . . . 4, which combination is characteristic for each register, and whereby each register may be responsive only in one particular time unit corresponding to said combination of impulse sources. This is to allow several registers, which have attempted to control the operation of the "ESBO" circuit simultaneously, to be able to do so, one at a time, and that particular register which first responds to the potential of +24 volts to obtain preference. By means of these three gates, a plurality, e. g. 100, of combinations may be obtained which correspond to as many different time positions, so that as may as one hundred registers may attempt to make a sequence test to the same "ESBO" circuit without causing seizure of said circuit by more than one register simultaneously.

Further, triggering impulses are applied to the grid of tube AT5 from source *d*3 after each unit time interval and via a condenser of 200 *p*F, in the manner described in connection with the operation of tube AT3. In this manner, tube AT5 will pass current at the beginning of a time unit interval following that in which the gates have allowed an impulse to go through. As soon as an impulse is allowed to pass through the gates, it will cause the condenser of 200 *p*F to be charged, and this charge, added to the charge supplied by the trigger source *d*3, will then be able to trigger tube AT5.

Tube AT5, together with tube AT6, constitute a double triode which in combination with the transformer GT1 operate as a blocking oscillator. Such a blocking oscillator is well known, and when tube AT5 is triggered, the flow of current through the anode resistance of 5000 ohms will cause a suitable potential to be induced in the winding of transformer GT1 which is connected between negative battery and the grid of tube AT6. By suitable design, tube AT6 will be momentarily triggered, and also, via the winding of transformer GT1 which is connected to the control electrode of the cold cathode tube VS, via a resistance of 500,000 ohms, tube VS will be made to fire. Accordingly anode current will flow from the source of test potential (+24 volts) at the third group selector "ESBO" circuit (Fig. 4), via the circuit already mentioned, rectifier RE1, make contact S*i*4 break contact D*i*7, the tube VS, a resistance, and relay T*r*, to a potential of —150 volts. It will be noted that current from the source of +24 volts, located in the sequence test circuit, also flows through a resistance of 10,000 ohms towards point P. This resistance of 10,000 ohms is connected at point P to rectifiers RE1 and RE2, the first being also connected to the test conductor, while the second is also connected to ground potential. In this manner, the rectifier RE1 will act as decoupling means while the rectifier RE2 will act as a limiter. Because of the flow of current, via the anode gap of tube VS, the potential at point P will be reduced to a value slightly above ground potential, the potential difference being absorbed in the resistance of 10,000 ohms connected to the rectifiers and also in the resistance of 10,000 ohms connected to wire 9. In this manner, point Q will also assume a potential slightly above ground potential, whereby the reduction of potential at point Q will prevent other registers from successfully testing during their respective and subsequent time positions.

When the test is successful that is, when an impulse reaches the grid of tube AT5, a relay T*r* which is included in the main gap circuit of tube VS, described above, operates, and this relay, at make contact T1, now closes a circuit in which one of relays D*r* or E*r* and L*r* or M*r* operates, depending on which of the four anode relays C*ar* to C*dr* of tubes Vc1 . . . 4 was energized. The relays C*ar* . . . C*dr* each correspond to 25 unit time positions, and the arrangement is such that relay D*r* operates whenever any of the outlets 00, 04, 08, 12, 16, 20, etc. and 03, 07, 11, 15, 19, 23, etc. was selected, E*r* whenever any of outlets 01, 05, 09, 13, 17, 21 etc. and 02, 06, 10, 14, 18, 22, etc. was selected, L*r* whenever any of outlets 01, 05, 09, 13, 17, 21 etc. and 03, 07, 11, 15, 19, 23, etc. was selected, and M*r* whenever any of outlets 00, 04, 08, 12, 16, 20, etc. and 02, 06, 10, 14, 18, 22 etc. was selected.

The operation of T*r* also opens the operating circuit of slow-to-operate relay R'*r* at T8 so as to prevent this relay from operating and breaking down the circuit in a manner to be described later.

A further consequence of the operation of T*r* is the energization of T*cr*, of the "ESBO" connector, via break contact B*o*5, make contacts T2, T*d*6, and T*g*1, and by the operation of this relay the circuits are now completed, via make contacts T*c*1 . . . 5, T*d*1 . . . 5 for the energization of a combination of code bar magnets EAM . . . EEM (Fig. 4) at the "ESBO" circuit via wires 3 to 7. These circuits are controlled by contacts of the anode relays A*ar* to A*er* and B*ar* to B*er* and are made according to a certain plan, so that from one to three magnets may operate so as to provide 25 different combinations. The code bar magnets shift their code bars to select a particular pair of vertical bars.

In this connection it should be mentioned that at the group selector "ESBO" circuit the relays D*lr* and E*lr* are normally operates in series with a resistance to —48 v. battery, and therefore wires 5 and 6 are normally extended to code bar magnets ECM and EDM.

As soon as a combination of code bar magnets EAM to EEM at the "ESBO" circuit has operated, their operating ground is extended, via one or more of their make contacts *am*1 to *em*1 and the winding of relay C*r* at the "ESBO" circuit, to wire 8 and make contacts T*c*8 (Fig. 11) which at the register (Fig. 10) are extended via either D1 or E1 and either L1 or M1 to the winding of relay H*rr*, which is connected to the battery. Relay H*rr*, by energizing, closes its contact H*r*1, which connects direct ground from make contact T*c*6 to its winding and also to wire 8, thus locking relay H*rr* and providing a locking circuit for the code bar magnets EAM to EEM.

It should be observed here that H*rr* has a winding of very high resistance, so that it can operate from the operating grounds of the code bar magnets at the "ESBO" circuits without causing the energization of relay C*r*, which has a low resistance. When relay H*rr* closes full ground on wire 8, C*r* can still not yet energize because it is kept short-circuited by having ground at both sides of its winding, so long as the operating circuits for the code bar magnets remain closed.

Relay B*r* is caused to release by the opening of its energizing ground at break contact H*r*2, and in turn opens at its make contacts B2 and B6 the ground to the anode circuits of all cold cathode tubes, so that those ionized extinguish and release their anode relays.

A consequence of this is that now the operating circuits for the code bar magnets are opened at the various circuits provided by make contacts of relays A*ar* to A*er* and B*ar* to B*er*. Those of relays D*r*, E*r*, L*r* or M*r* that were energized will not release, however, at this moment, because these relays lock themselves to make contact H*r*3. The removal of the operating ground for the code bar magnets now causes those magnets that were energized to hold via their own make contacts and in series with the winding of relay C*r* to the full ground provided on wire 8 at the register circuit, so that relay C*r* may now operate. As a consequence of this, wires 3 to 7 at the "ESBO" circuit are changed over from the code bar magnets to other circuits, at changeover contacts C1 to C5. Further, at break contact C6 the test potential to the registers is now opened. At the same time relay B*r*, by releasing, opens the circuit for relay S*ir*, which in turn, by releasing, de-energizes relay T*dr*. This latter relay at make contacts T*d*1 . . . 5 disconnects wires 3 to 7 from the operating contacts for the code bar magnets at the "ESBO" circuit.

The release of relay S*ir* disconnects wire 9 from the sequence test circuit at S*i*2 and releases relay T*r* at S*i*4. This disables the sequence test circuit.

The fact that relay C*r* has operated at the "ESBO" circuit is checked by the operation of relay C*gr* at the register circuit in the following path: A terminal connected to —150 volts potential (shown in the lower central portion of the "ESBO" circuit), resistance, make contacts E*l*4, D*l*4 and C5, wire 7, make contact T*c*5, (Fig. 11) break contact T*d*5 at register (Fig. 10), break contact T3, winding of C*gr*, to —48 v. battery. Relay C*gr* operates its helping relay C*hr* which locks via make contacts C*h*6 and T*c*7 under the control of relay T*cr*. Relay C*hr* has the following functions:

Firstly, under the control of either relay L*r* or M*r* it closes the operating circuit for one of the vertical servo-magnets SV*am* or SV*bm* which is now closed from ground (Fig. 11) at make contact C*h*1 via either of make contacts L2 or M2, either of break contacts T*d*1 or T*d*2 and the connected make contact T*c*1 or T*c*2, wire 3 or 4, to the "ESBO" circuit (Fig. 4), where it is completed via either of make contacts C1 or C2 to either vertical servo-magnet SV*am* or SV*bm*. The operation of a particular vertical servo-magnet lifts a particular one of the pair of selected vertical bars at the multi-selector.

Secondly, the operation of C*hr* releases either relay E*lr* or D*lr* at the "ESBO" circuit, depending upon which one of relays E*r* and D*r* is operated. If relay E*r* is operated, a circuit is completed from ground at make contact C*h*2 at the register (Fig. 10), make contact E2, break contact T*d*3, make contact T*c*3 in the "ESBO" connector (Fig. 11), wire 5 to the "ESBO" circuit (Fig. 4), make contact D*l*3, make contact C3 to the terminal of relay E*lr*, which short circuits and releases this relay. If relay D*r* is operated, a similar circuit is completed from ground at make contact C*h*2, make contact D2, break contact T*d*4, make contact T*c*4, wire 6, make contact E*l*3, make contact C4 to the terminal of relay D*lr*, which short circuits and releases this relay.

The fact that the relay, thus short-circuited, has released, is checked by the opening of the circuit connected to −150 volts potential at either make contact E*l*4 or make contact D*l*4 at the "ESBO" circuit, which causes the relay C*gr* at the register to release. As soon as this has happened, the third function of relay C*hr* commences, which is to connect a ground obtained from break contact H*c*1 (upper center of Fig. 8), via make contact C*h*3 and break contact C*g*2, the "C" lead of the conversational train of switches through the cord circuit and first and second group selectors (Fig. 12), across Fig. 4, to the "*c*" lead of the third group selector (Fig. 3), and break contact HB2, for the operation of individual horizontal magnet HM of the individual third group selector which is being controlled from the register, the other ends of the windings of all the HM magnets of the multi-switch being connected to battery in the "ESBO" circuit. The particular HM magnet operates and closes its contacts H1 and H2.

The fact that magnet HM has operated is signalled to the register from the individual selector (Fig. 3), by the closure of ground at make contact H1 at the selector via the break contact on the horizontal bar HB1 and the "D" lead of the conversational train of switches, which at the register (Fig. 8), causes the operation of relay H*cr*. This removes the operating circuit for the individual horizontal magnet by opening the ground at break contact H*c*1, but the horizontal magnet is locked via its make contact H2 to ground provided from the H1 make contact at the preceding selector, via the "E" lead.

Further, at this same moment another circuit is closed via break contact C*g*3 (connected to the point "Q" of the sequence test circuit in Fig. 10 via break contact D*f*′1) and make contact C*h*4 in which the electronic sequence test arrangement is connected to either wire 5 or 6 of the "ESBO" circuit, depending on which one of relays D*r* and E*r* are operated. If relay D*r* is operated, the circuit extends from the point "Q" via break contacts D*f*′1, and C*g*3, make contact C*h*4, make contact D3, break contacts E2 and T*d*3, to the "ESBO" connector, make contact T*c*3, to wire 5, from which it is further extended via break contact D*l*3 (relay D*lr* having been released) to a make contact, e. g. VB*a*1, controlled by the vertical bar which has operated. If relay E*r* is operated, the circuit extends from point "Q" via break contacts D*f*′1 and C*g*3, make contact C*h*4, make contact E3, break contacts D2 and T*d*4, make contact T*c*4, to wire 6, from which it is further extended via break contact E*l*3 (relay E*lr* having been released in this case) to a make contact, e. g. VB*a*2, controlled by the vertical bar which has operated.

These vertical bar contacts are individually connected to the "*e*1" outlets of the third group selector which normally are supplied with "free" test potential. Accordingly, the sequence test arrangement at the register (Fig. 10) will function when free test potential is present on the test lead.

When relay H*cr* operates a circuit is closed for slow-to-operate relay R′*r* from grounded battery, make contact H*c*5, break contact T8, and break contact R*l*6, but if the selected outlet is free, this relay is prevented from operating by the opening of the circuit at break contact T8.

The operation of the sequence test arrangement has already been described in connection with the testing for the "ESBO" circuit, and as soon as current flows through the main gap of tube VS, indicating that the selected outlet is free, the test arrangement immediately renders this test potential busy by causing a potential drop via point Q, wire 5 or 6, to Fig. 4, make contact VB, test lead, lead "*e*1," Fig. 3, and lead "*e*" of the final selector circuit, Fig. 5, break contact H2, jack BJ, across the two resistances of 10,000 ohms (Figs. 5 and 6) connected in series to lead 9. This has the double effect that no other "ESBO" circuit can engage this outlet by the operation of its sequence test arrangement and further that the "free" condition for this outlet is removed from the explorer at the "ESBO" circuit, Fig. 4, so that no further impulses will be supplied by this explorer for the outlet in question.

The operation of the test relay T*r* at the register, (Fig. 10), now closes the circuit for one of the horizontal servo-magnets at the "ESBO" circuit, (Fig. 4), depending on whether relay E*lr* or D*lr* at this "ESBO" circuit was de-energized. This circuit is as follows:

Ground, (upper center of Fig. 10), make contact H*c*2, make contact T3, break contact T*d*5, make contact T*c*5, (Fig. 11), wire 7 to the "ESBO" circuit, (Fig. 4), via make contact C5, and either to the horizontal servo-magnet S*ham* via break contact D*l*4 or the horizontal servo-magnet S*hbm* via make contact D*l*4 and break contact E*l*4.

The operation of the horizontal servo-magnet now switches through the individual selector to the selected outlet leading to the final selector of Fig. 5 by moving the horizontal bar in the proper direction, owing to which the selector contacts "A" to "E" are closed and horizontal bar contacts HB1 and HB2 are opened.

The opening of HB1 disconnects ground from conductor "D," so that thereby relay H*cr* is released at the register, which, at make contact H*c*2, opens the circuit for the horizontal servo-magnet, so that this magnet releases. The opening of contact HB2 at the selector disconnects the circuit for the horizontal magnet from the "C" lead, so that this lead is connected through clean to the next selector, which in this case is the final selector of Fig. 5.

This is equally the case with conductor "D," owing to the opening of break contact HB1. The ground provided at make contact H1 at the individual selector is now extended via selector contact "E" to the "*e*" conductor of the next selector.

After the moving of the horizontal bar, the identity of the "ESBO" circuit which is associated with the selector in the next engaged switching stage is signalled to the register. This operation happens as follows:

At the moment H*cr* in the register, (Fig. 8), releases by the opening of break contact HB1 at the individual switch, (Fig. 3), a circuit is closed at the register for the operation of relay O*kr* from break contact C*g*4, make contact C*h*5, and break contact H*c*3. Relay O*kr* recloses the circuit for relay B*r* at make contact O*k*1, via break contact B*o*3 and relay B*r*, by re-energizing, applies the ground again to the anode circuits of the cold cathode tubes V*a* . . V*e* at make contact B2, and applies −150 volts to the cathode of tube V*g* at make contact B6, preparing these tubes for the receipt of another impulse. At the same time, +24 volts potential (upper central portion of Fig. 8), is connected via a resistance, make contact B3, break contact Hs1, and make contact Ok2 to the comparator circuit, so that this circuit is thereby rendered dependent exclusively on impulses received from the separating tube St.

The circuit just mentioned includes a break contact Hs1 of relay Hsr, which, it will be remembered, was assumed to be operated when the operation commenced. This relay Hsr is the hundreds selection relay, and thus has kept a record of the previous "class-of-outlet" indication, which was received from the "ESBO" circuit from the preceding selector, this relay being one of several similar relays, for example, the final selector relay FSR, which are selectively operated upon the receipt of this "class-of-outlet" indication.

The class-of-outlet relay (in this case relay Hsr) is released, as soon as the double test on the selected outlet has succeeded, by the operation of relay Okr, which, at break contact Ok3, opens the holding circuit of Hsr. The release of relay Hsr releases relay Tgr at make contact Hs4, and relay Tgr disconnects wires 1 and 9 from the third group selector "ESBO" circuit. At this moment the register circuit is ready to receive the next class-of-outlet indication which is supplied from the "ESBO" circuit of Fig. 4 by means of a second explorer circuit connected to the grid circuit of an amplifying tube AT2 which is connected via wire 2 to the register.

This second exploring circuit is composed in a different manner from that of the first; in principle it comprises two stages of gates, connected to the five sources Pa1 . . . 5 and and five sources Pb1 . . . 5, respectively. There are five groups of five conductors each. The conductors of each group are connected, respectively, to sources of impulses Pb1 to Pb5 through individual rectifiers. The five conductors of each group are connected to a first common point 1c, indicated by the numeral "5," through decoupling rectifiers, so that there are five of these first common points 1c. These first common points 1c are connected, respectively, to sources of impulses Pa1 to Pa5 through individual rectifiers. The five first common points 1c are also connected through decoupling rectifiers to a single second common point 2c, also indicated by the numeral "5," since there are five conductors connected to it. The second common point 2c is connected directly to the grid of tube AT2. The sources Pb1 . . . 5 and Pa1 . . . 5 provide 25 time positions, one for each of the 25 conductors.

Each of the 25 conductors connected to the Pb sources may be connected, via a decoupling rectifier to two or more additional conductors, each of which, via a resistance of 100,000 ohms, is connected to one of the terminals 00 to 49. The drawing shows two additional conductors for each of the 25 conductors. The first additional conductors are connected, respectively, to the terminals 00 to 24 and the second additional conductors are connected, respectively, to the terminals 25 to 49.

Each of the additional conductors connected to terminals 00 to 49 is connected via two further rectifier gates to a combination of impulses composed of one impulse each from two further sets of impulse sources denominated Pc1 . . 4 and Pe1 . . . 3. These impulses are also indicated in the diagram of Fig. 10. The first additional circuits are connected to sources Pc1 or 2 and Pe1, 2, or 3. The second additional circuits are connected to sources Pc3 or 4 and Pe1, 2, or 3.

The manner in which the different leads have to be connected to these sources is illustrated for a typical example in the table accompanying Fig. 4. This table shows that in principle it is possible to give six different classes of signals, by means of two sets of combinations for each class from two Pc sources 1, 3 and 2, 4 and three different Pe sources. As indicated in the drawing, the first pair of additional conductors is connected respectively to terminals 00 and 25, the second pair to terminals 01 and 26, and so on. Thus, the leads 00 and 25; 01 and 26; . . . 24 and 49 are connected in parallel, and the leads of each pair are connected to different Pc sources, so that the twenty-five combinations of Pa and Pb sources, in conjunction with two different Pc Pe combinations, e. g. 1, 1, and 3, 1, give fifty possibilities.

Each of the six classes A—F in the table of Fig. 4 comprises 50 different signals which are used to indicate the 50 positions which are provided in each of the "ESBO" connectors for the connection of "ESBO" circuits, and each class of signal may be used to indicate a different "ESBO" connector. For example, classes of signals A and B are used for two different "ESBO" connectors, each of which may give access to 50 "ESBO" circuits serving final selectors, so that by these two classes of signals 100 different "ESBO" circuits may be indicated, serving a total of 10,000 lines.

As has been explained previously, the manner in which the "ESBO" circuits are distributed over the "ESBO" connectors is preferably such that all "ESBO" circuits connected in a switching stage are connected to the same "ESBO" connector, so that, in general, but not exclusively, the signals from the "ESBO" circuits connected to the same "ESBO" connector are of the same class. The class of this signal, given by the Pc, Pe constituents, then serves to indicate that the register must, for the next selection, make use of one particular "ESBO" connector, and the particular identity of the signal, given by the Pa, Pb, Pc constituents, indicates the outlet for the required "ESBO" circuit on this "ESBO" connector.

From the above, it will be seen that in principle it is possible to indicate that for the next selection use has to be made of one out of six groups of "ESBO" circuits and one out of up to fifty different "ESBO" circuits in a group. Exactly which of these "ESBO" circuits is to be used, depends on the particular outlet which has been selected by the selector under consideration. Since the outlets from a group selector may go to different multi-switches at the next stage, each multi-switch having its own "ESBO" circuit, the indication of the required "ESBO" circuit at one stage has to be sent from the "ESBO" circuit used at the preceding stage, and selection of the signal to be sent from the preceding "ESBO" circuit must be determined by the identity of the outlet selected.

The case may occur in which the outlets of one group selector make use of a large number of different "ESBO" circuits, e. g. in the case of the third group selectors, shown in Fig. 2, these are divided into ten numerical groups each serving 1000 lines, and the different selectors in each numerical group are divided over five multi-selectors and therefore comprise five "ESBO" circuits. The total number of "ESBO" circuits for the third group selectors is therefore 50, and when any one of these group selectors is selected by the preceding "B" second group selector, any one of these 50 "ESBO" circuits may have to be indicated by the "ESBO" circuit of this "B" second group selector.

This indication happens by connecting a terminal ECT, which is provided individually for each group selector outlet, via one of the make contacts on its associated vertical bar, to that one of the terminals 00 to 49 which represents the wanted "ESBO" connector outlet. The operation of the vertical bar, therefore, closes a circuit, via one of the contacts on the operated bar, corresponding to the selected outlet, which, in the manner described, is jumpered to one of terminals 00 to 49. In this circuit, battery potential from +24 volts is connected via either make contact D12 or E12 at the "ESBO" circuit, a 10,000 ohm resistance, and either of break contacts El1 or Dl1 and the vertical bar contact, e. g. VBa3, corresponding to the selected group selector outlet, to the terminal ECT, which terminal indicates the outlet number on the "ESBO" connector to which is connected the "ESBO" circuit corresponding to the selected outlet.

The result of the closure of this circuit is that an impulse is produced by the second exploring circuit in a particular time unit which is characteristic both for the outlet number of the "ESBO" connector and of the particular class-of-outlet. This signal is transmitted via wire 2, which is now connected at make contact O*k*4 to the grid of the decoupling tube ST at the register (Fig. 8), which tube transmits this signal immediately to tube AT3, because, as explained before, the connection of +24 volts potential to the comparator at make contact B3 renders this comparator independent of the connection of a reference source.

The transmission of the impulse to tube AT3 acts on this tube and the other associated tubes, in the same way, as described above in connection with the selective impulses, so that the final result is that, in the time unit following that in which the impulse is received, another impulse is supplied from tube AT4 to the control electrodes of the cold cathode tubes V*a* . . . V*e* and V*g*. One of each of the four sets of cold cathode tubes V*a*, V*b*, V*c*, and V*e* now ionizes, depending on the time unit in which the impulse is received, and causes the operation of its corresponding anode relay. At the same time tube V*g* is operated and its accompanying relay F*r*. Relay F*r* operates relay S*ir*, as before, over F1 front and B1 front and relay S*ir* closes the circuit for slow-to-operate relay R'*r* at make contact S*i*5. Relay R'*r*, however, does not begin to operate before relay R*lr* has had a chance to operate and open the circuit at break contact R*l*6.

For the purpose of checking the fact that one of each of the four groups of tubes V*a*, V*b*, V*c*, and V*e* has ionized, a circuit is completed via a make contact of any one relay of each group for the operation of relay R*lr*. This circuit is closed from ground in the register (Fig. 10), at make contact L*a*1 and via a make contact of one relay of each of the four groups and make contact O*k*5. When R*lr* operates, it locks itself at R*l*1, independent of O*k*5, and at break contact R*l*2 it opens the holding circuit for relay T*cr* which, by releasing, disconnects the register from the "ESBO" circuit of the group selector under consideration by opening make contacts T*c*1 . . . 5 and 8.

At the same time, at break contact R*l*3, the circuit is opened for relay L*ar* and whichever one of the servo-magnets SH*a* or SH*b* of the "ESBO" connector at the register circuit happened to be operated. At make contact T*c*6 the holding circuit for relay H*rr* is opened, which, in its turn, at make contact H*r*3, opens the holding circuits for whichever of the relays D*r*, E*r*, L*r* or M*r* were energized. At make contact T*c*7, the holding circuit for relay C*hr* is opened, which relay, by releasing, at make contact C*h*5, opens the circuit for relay O*kr*. Relay O*kr*, T*gr*, T*cr* are now all released, so that the connections via all wires 1 to 9 are severed.

The "ESBO" connector that was connected to the group selector "ESBO" circuit under consideration is now completely released, and, as a consequence thereof, the other circuits towards this "ESBO" circuit are also opened. This means that the holding circuit for relay C*r* and the combination of code bar magnets energized at that "ESBO" circuit is now also opened, so that these release, as well as those of the servo-magnets that were energized, via wires 3 or 4 and 7. The result is that the short-circuit for either E*lr* or D*lr* is removed, so that both these relays are again energized, and now the "ESBO" circuit is again in the normal condition and may be selected by another register.

The anode relays of the cold cathode tubes that operate at the register, as a result of the class-of-outlet indication, take a record of both the "ESBO" connector to be used and the outlet number of this "ESBO" connector, for selecting an "ESBO" circuit of the next selecting stage, in this case the final selector stage. The drawing assumes that the group selector considered was a third group selector for which the class-of-call relay H*sr* (hundreds selection relay) was operated and that the next selection to be made is that on the final selector, for which the class-of-call relay F*sr* (final selection relay) has to be operated. It further assumes that the final selector "ESBO" circuit (Fig. 6), could be connected to the same "ESBO" connector as the third group selector.

The class-of-call relay F*sr* (final selection relay) is operated under the control of a combination of anode relays associated with tubes V*c*1 . . . 4 and V*e*1 . . . 3. According to the table in Fig. 4, the signals used to indicate the final selector stage either comprise signals P*c*1 or 3 and P*e*1 or 2. In the particular case assumed, it is supposed that all final selectors are comprised in the first group of 5,000 lines, and therefore the sources used at the "ESBO" circuit are P*c*1 or 3, (depending on whether the first or the second group of 25 outlets on the "ESBO" connector have to be selected) and P*e*1. Accordingly, at the register circuit, a circuit will be completed for the operation of F*sr* via make contact C*a*1 or C*c*1 and make contact E*a*1. Relay F*sr* provides a holding circuit for itself via make contact F*s*1 to ground at break contact O*k*3. Relay F*sr* also operates relay T*gr* in the selected "ESBO" connector, (Fig. 11), over make contact F*s*2 to ground. Relay T*gr* then operates the "ESBO" connector relay E*ccr* over make contact T*g*6, break contact O*k*6, make contact S*i*3, break contact L*a*2, to ground.

The particular outlet to be selected on the "ESBO" connector is determined, in the first place, by the combination of tubes V*a* and V*b* that have energized. By means of these tubes, 25 different combinations are obtained, which may either indicate the first 25 outlets on the "ESBO" connector or the last 25 of these outlets. Which of these two sub-groups is to be used is indicated by one of the tubes V*c*, since the V*c* tubes are controlled by R*c* impulses which correspond in time positions with the P*c* impulses.

As may be seen from the table on Fig. 4, source P*c*1 is used for the first group of 25 outlets and source P*c*3 for the second group of 25 outlets, so that, according to whether tube V*c*1 or tube V*c*3 has ionized, the first or the second half of the "ESBO" connector has to be selected.

The combination of anode relays controlled by tubes V*a* and V*b* cause the energization, in one of 25 different combinations, of the five code bar magnets AM to EM of the "ESBO" connector at the register, in the same way as this has been explained in conjunction with the code bar magnets of the "ESBO" circuit.

In the present case the circuit for these code bar magnets is completed from ground via contacts of the anode relays A*ar* to A*er* and B*ar* to B*er* and via the five make contacts E*cc*1 . . . 5 of the "ESBO" connector relay E*ccr*. The B*or* relay is operated when any of the code bar magnets operates over one or more make contact of the code bar magnets connected in parallel.

As soon as the class-of-call relay F*sr* operates, this determines which of the "ESBO" connectors associated with the register has to be used for the selection of the next "ESBO" circuit, and for this purpose the contact F*s*2 of this relay is connected as required to the winding of the relay T*gr*, one of which is associated with each of these "ESBO" connectors.

In the present case, it is assumed that the final selectors may be reached over the same "ESBO" connector as the third group selectors, so that the T*gr* relay of the "ESBO" connector which had already served previously under control of make contact H*s*4, is now again operated under control of F*s*2. This evidently is possible only if the number of final selector "ESBO" circuits is so small that they can be accommodated on the same "ESBO" connector that is used for the third group selector "ESBO" circuits, which is the case only when the equipment of the exchange is well below 5,000 lines. In other cases a separate "ESBO" connector is usually employed for the connection of the final selector "ESBO" circuits.

As soon as the "ESBO" connector to be used has been indicated in this way, a circuit is prepared for the operation of the "ESBO" connector relay E*ccr* over the circuit described above.

The operation of the combination of code bar magnets, as described above, decides which outlet in a sub-group of 25 on the "ESBO" connector has to be selected and lifts the vertical bar associated therewith.

It is now decided which of the two sub-groups of 25 has to be employed by the operation of one of the two servo magnets SH*a* and SH*b*, associated with the "ESBO" connector. A circuit for one of these magnets is closed after the code bar magnets have operated (which is checked by the energization of relay B*or* via the make contacts of these code bar magnets in parallel) via either make contact E*cc*6, make contact and either of make contacts C*a*3 or C*b*1, or make contact E*cc*7, make contact B*o*2, and either of front contacts C*c*3 or C*d*1. Magnet SH*a* will energize whenever cold cathode tube V*c*1 or 2 is ionized, i. e. for the first 25 groups of outlets, and magnet SH*b* will operate whenever cold cathode tube V*c*3 or V*c*4 is ionized, i. e. for the 2d group of 25 outlets.

The servo magnet energized causes the closure of the contacts 1 to 9 of the selected connector outlet to the "ESBO" circuit indicated, and this magnet prepares a locking circuit for itself via its own make contact (SH*a*1, SH*b*1), and break contact R*l*3, (which is at present open because R*lr* is still operated), in series with the winding of relay L*ar* to ground. Relay L*ar* will not in any case operate so long as full ground is maintained on its winding via the operating circuit of either of servo magnets SH*a* or SH*b*.

At either of break contacts SH*a*2 or SH*b*2 the circuit for relay R*lr* is now opened and this relay starts to release slowly. Upon releasing, R*lr* opens the circuit of B*r* at make contact R*l*4, (B*or* by being energized maintaining B*o*3 opened at the same time) and B*r*, by releasing, now disconnects the energizing circuits of the cold cathode tubes at make contacts B2 and B6, which deionize and release their anode relays, including relay F*r* which releases relay S*ir*. The release of relay R*lr* also closes the circuit for slow-to-operate relay R'*r* at break contact R*l*6, but the release of relay S*ir* before relay R'*r* can operate opens this circuit again. Relay S*ir* releases relay T*dr* at make contact S*i*1 and relay T*r* at make contact S*i*4. The operating circuit for the servo magnet SH*a* or or SH*b* is now opened by the release of relays C*a*, C*b*, C*c*, and C*d*, so that now relay L*ar* is able to operate in its locking circuit. This releases relay E*ccr*, which once more opens the circuit for all code bar magnets of the "ESBO" connector, that had already released owing to the deenergization of the anode relays. The operating circuit for the "class-of-call" relay F*sr* is also opened, but this relay holds, as described before.

By the release of the code bar magnets relay B*or* is deenergized and at break contact B*o*3 recloses the circuit for relay B*r*, and after this relay has re-energized, the circuit is again in the condition as described at the commencement of this description, with the exception of the fact that the "class-of-call" relay F*sr* is energized instead of H*sr*, so that the next selection to be controlled will be that on the final selector under the control of the tens and units digits.

From the above description, it will be noticed that the selected outlet is busied from the moment the register has connected the electronic sequence test arrangement to this outlet and the outlet has successfully tested. This busy condition is taken over from the individual selector, as soon as this is switched through, by the connection of a full ground to the test lead via contact "E" and make contact H1 of the third group selector, the presence of full ground on this test lead preventing the transmission of impulses from this test lead via the first explorer. The circuit remains in this condition, during which the test potential is short-circuited, until the individual horizontal magnet at the next selecting stage operates, which disconnects the test potential from the test lead of the next selector at break contact H2, whereas this is now used for locking of the individual horizontal magent via make contact H2.

FINAL SELECTOR AND LINE FINDER

With respect to the line finders and finder selectors, the circuits provide the following operating features:

(*a*) The condition of a called line (free, busy, etc.) and the class of this line may be determined in one operation and by exclusively electronic methods. This means that, in order to obtain the class of the wanted line, it is not necessary to operate any part of the mechanical switch, as, for instance, a vertical bar.

(*b*) A consequence of the arrangement mentioned under (*a*) is that if two or more registers are connected to one "ESBO" circuit for final selectors, either in conjunction with calls to the same subscriber or to different subscribers in the same hundreds group, the exploring operation for determining the condition of the lines is not stopped during the time the class of the line is signalled for one or more of these calls.

(*c*) As the "ESBO" circuit is provided in common both for the finals electors and line finders serving a group of 100 lines and which together constitute the multi-switch associated with the "ESBO" circuit, the exploring operations may take place simultaneously for final selectors and line finders. The exploring operation referred to in connection with line finders serves particularly to investigate the class of a calling line (unrestricted, restricted, coin box line, etc.).

(*d*) The exploring operation for final selectors, by which both the condition and class of a wanted line may be determined for one or more calls simultaneously, may, in connection with a line finder, also take place simultaneously with the action of signalling the identity of a calling line from the call detector (not disclosed) to the regiser handling an originating call.

(*e*) The functions described under items (*c*) or (*d*) may, in connection with one or more calls to P. B. X groups, also take place simultaneously with the hunting action for a free line in either one P. B. X group or in different P. B. X groups.

(*f*) All operations involved in P. B. X hunting, i. e. recognition of selected line as first line of a P. B. X group, recognition of busy condition of this line, hunting operation for free line in this group and possibly the stopping of P. B. X hunting after the whole group has been hunted over, and determination whether a line on which hunting was stopped is free or busy, may be executed by exclusively electronic functions at the "ESBO" circuit and without requiring the operation of even part of the mechanical switch. This holds true also in case a busy single line was selected.

(*g*) All of the operations referred to in items (*a*)—(*f*) may continue uninterruptedly during the time the mechanical switch is made to function in order to connect through one call for which the electronic operation has been completed.

OPERATION OF FINAL SELECTOR

Fig. 5 shows an individual final selector circuit, forming part of a multi-switch for final selectors and line finders serving a group of 100 lines, and Fig. 6 shows the "ESBO" circuit associated with this multi-switch.

As soon as the register has received the tens and units digits of the wanted line and the final selector "ESBO" circuit of Fig. 6 has been connected the register investigates the condition and class of this line by means of an electronic explorer, located at the "ESBO" circuit which is similar to the explorer described in connection with the circuit of Fig. 4, and which, in each 100 consecutive time units, may send a signal for the corresponding 100 lines served, each time unit corresponding to a line.

The explorer is controlled by three groups of impulses P*a*, P*b* and P*c*, (which, however, vary between −40 volts and −16 volts), in a similar manner to that of Fig. 4, so that each outlet produces an impulse whose position in time characterizes the outlet.

Impulses P*d*1 . . . 11, (also varying between −40 volts and −16 volts), are employed to provide an indication as to the condition and the class of any of these 100 lines, for which purpose each line may have two terminals, denominated A and B, respectively.

There are thus 100 sets of two terminals A and B for a group of 100 lines and these terminals are indicated by the symbols A00/99 and B00/99 in Fig. 6.

An example of the manner in which the sources P*d*1 . . . 11 may be employed in conjunction with terminals A and B of each line is shown in the following Table No. I.

*Table I*

| Class of Line | Term. A Source Pd— | Term. B Source Pd— |
|---|---|---|
| 1st line of non-consecutive P. B. X group No. 1 (if unrestricted) | 6 | 1 |
| 1st line of non-consecutive P. B. X group No. 2 (if unrestricted) | 6 | 2 |
| 1st line of non-consecutive P. B. X group No. 3 (if unrestricted) | 6 | 3 |
| 1st line of non-consecutive P. B. X group No. 4 (if unrestricted) | 6 | 4 |
| 1st line of non-consecutive P. B. X group No. 5 (if unrestricted) | 6 | 5 |
| 1st line of non-consecutive P. B. X group No. 1 (if restricted) | 7 | 1 |
| 1st line of non-consecutive P. B. X group No. 2 (if restricted) | 7 | 2 |
| 1st line of non-consecutive P. B. X group No. 3 (if restricted) | 7 | 3 |
| 1st line of non-consecutive P. B. X group No. 4 (if restricted) | 7 | 4 |
| 1st line of non-consecutive P. B. X group No. 5 (if restricted) | 7 | 5 |
| Other lines of non-consecutive P. B. X group No. 1 (if unrestricted) | 1 | 6 |
| Other lines of non-consecutive P. B. X group No. 2 (if unrestricted) | 2 | 6 |
| Other lines of non-consecutive P. B. X group No. 3 (if unrestricted) | 3 | 6 |
| Other lines of non-consecutive P. B. X group No. 4 (if unrestricted) | 4 | 6 |
| Other lines of non-consecutive P. B. X group No. 5 (if unrestricted) | 5 | 6 |
| Other lines of non-consecutive P. B. X group No. 1 (if restricted) | 1 | 7 |
| Other lines of non-consecutive P. B. X group No. 2 (if restricted) | 2 | 7 |
| Other lines of non-consecutive P. B. X group No. 3 (if restricted) | 3 | 7 |
| Other lines of non-consecutive P. B. X group No. 4 (if restricted) | 4 | 7 |
| Other lines of non-consecutive P. B. X group No. 5 (if restricted) | 5 | 7 |
| Single line (unrestricted) | 11 | 6 |
| Single line (restricted) | 11 | 7 |
| Directory number of non-numerical P. B. X group | 7 | 6 |
| All lines but last of consecutive P. B. X group (if unrestricted) | 6 | 11 |
| All lines but last of consecutive P. B. X group (if restricted) | 7 | 11 |
| Last line of consecutive P. B. X. group (unrestricted) | 11 | 6 |
| Last line of consecutive P. B. X group (restricted) | 11 | 7 |
| 1st party of 4-party line on terminal per station basis | 6 | 10 |
| 2nd party of 4-party line on terminal per station basis | 7 | 10 |
| 3rd party of 4-party line on terminal per station basis | 9 | 10 |
| 4th party of 4-party line on terminal per station basis | 11 | 10 |
| Long period absentee (unrestricted subs.) | 9 | 6 |
| Long period absentee (restricted subs.) | 9 | 7 |
| Changed number | 11 | 9 |
| Dead Line | 8 | 9 |

The following observations are made with respect to this table:

1. Source P*d*6 is used to indicate a subscriber with unrestricted service facilities and source P*d*7 a subscriber with restricted service facilities. These sources may be used either in connection with terminal A or B.

2. A combination of sources 6 and 7 on terminals A and B represent a special case, viz. a subscriber's number which has been reserved in connection with a so-called non-numerical P. B. X group and which serves as a directory number for this P. B. X group. This number is not connected to a line, but when selected the combination of sources 6 and 7 informs the register that it deals with a call to a non-numerical P. B. X group.

3. Sources P*d*1 . . . 5 identify different P. B. X groups with non-consecutive number, i. e. in each group of 100 lines the possibility is provided to constitute 5 P. B. X groups of which the numbers may be taken at random from the 100 lines of the group and each of these groups will be identified by the presence of a respective one of the impulse sources P*d*1 . . . 5 on all lines of the group.

4. It will be observed that a distinction is made between the first line of a P. B. X group with non-consecutive numbers and the other lines. The first line is that which is listed in the directory and which should be called in order to select this line and to commence P. B. X hunting if this line is found busy. The other numbers of this type of the group may also be called by direct selection, but in this case they will not initiate P. B. X hunting when busy and will behave like a single line. Such lines may advantageously be employed for night switching purposes at P. B. X's.

It will further be observed that the only distinction between the first line and the other lines, as far as the connection of impulse sources is concerned, is that the characteristic P. B. X-group source for the first line is connected to terminal B and for the other lines to terminal A; in other words, by a reversal of the connection of the sources to terminals A and B.

5. A single line is identified by the connection of source P*d*11 to terminal A in combination with the connection of either of source P*d*6 or 7 to terminal B.

The same combination of sources is employed for the last line of P. B. X groups with consecutive numbers on which normally hunting should stop. The other lines of this type of P. B. X group are characterized by a reversal of these two sources to the A and B terminals.

6. There are four combinations which are characterized by the employment of source P*d*10 in connection with terminal B. These have been indicated, by way of example, for use with 4-party lines working on a "terminal per station" basis. If such party lines are not equipped, they may be used for other purposes, such as for indication of coin box stations, party lines working on a "terminal per line" basis, etc.

7. Source P*d*8 is not used with any of these indications except with that indicating dead lines. Source P*d*8 is, in general, employed to indicate the busy condition of a line. For this purpose it is connected to the individual line terminal whenever this is engaged from either a line finder or a final selector. Figs. 5 and 7 show that source P*d*8 may be connected via make contact H3 and terminal D of the selector to the *"d"* lead of the subscriber's line circuit, which, on Fig. 6, is extended to the explorer circuit associated with terminals A and B. Whenever a line is engaged, the impulses supplied from source P*d*8 are connected for this line and suppress those supplied from the impulse source connected to terminal A. The impulses supplied from terminal B, however, will not be suppressed when the line is engaged, because this is prevented by the connection of a rectifier between the *"d"* lead and the point of attachment of the impulse source connected to terminal B.

As a result of this the impulses that will be supplied to the explorer for busy lines will be different from those on free lines, as is shown by the Table No. II below, which indicates the impulses for the different classes of lines supplied when they are busy.

*Table II*

BUSY LINES

| Class of Line | Term. A Source Pd— | Term. B Source Pd— |
|---|---|---|
| 1st line of non-consecutive P. B. X group No. 1 (if unrestricted) | 8 | 1 |
| 1st line of non-consecutive P. B. X group No. 2 (if unrestricted) | 8 | 2 |
| 1st line of non-consecutive P. B. X group No. 3 (if unrestricted) | 8 | 3 |
| 1st line of non-consecutive P. B. X group No. 4 (if unrestricted) | 8 | 4 |
| 1st line of non-consecutive P. B. X group No. 5 (if unrestricted) | 8 | 5 |
| 1st line of non-consecutive P. B. X group No. 1 (if restricted) | 8 | 1 |
| 1st line of non-consecutive P. B. X group No. 2 (if restricted) | 8 | 2 |
| 1st line of non-consecutive P. B. X group No. 3 (if restricted) | 8 | 3 |
| 1st line of non-consecutive P. B. X group No. 4 (if restricted) | 8 | 4 |
| 1st line of non-consecutive P. B. X group No. 5 (if restricted) | 8 | 5 |
| Other lines of non-consecutive P. B. X group No. 1 (if unrestricted) | 8 | 6 |
| Other lines of non-consecutive P. B X group No. 2 (if unrestricted) | 8 | 6 |
| Other lines of non-consecutive P. B. X group No. 3 (if unrestricted) | 8 | 6 |
| Other lines of non-consecutive P. B. X group No. 4 (if unrestricted) | 8 | 6 |
| Other lines of non-consecutive P. B. X group No. 5 (if unrestricted) | 8 | 6 |
| Other lines of non-consecutive P. B. X group No. 1 (if restricted) | 8 | 7 |
| Other lines of non-consecutive P. B. X group No. 2 (if restricted) | 8 | 7 |
| Other lines of non-consecutive P. B. X group No. 3 (if restricted) | 8 | 7 |
| Other lines of non-consecutive P. B. X group No. 4 (if restricted) | 8 | 7 |
| Other lines of non-consecutive P. B. X group No. 5 (if restricted) | 8 | 7 |
| Single line (unrestricted) | 8 | 6 |
| Single line (restricted) | 8 | 7 |
| All lines but last of consecutive P. B. X group group (if unrestricted) | 8 | 11 |
| All lines but last of consecutive P. B. X group (if restricted) | 8 | 11 |
| Last line of consecutive P. B. X group (unrestricted) | 8 | 6 |
| Last line of consecutive P. B. X group (restricted) | 8 | 7 |
| 1st party of 4-party line on terminal per station basis | 8 | 10 |
| 2nd party of 4-party line on terminal per station basis | 8 | 10 |
| 3rd party of 4-party line on terminal per station basis | 8 | 10 |
| 4th party of 4-party line on terminal per station basis | 8 | 10 |
| Long period absentee (unrestricted subs) | 8 | 6 |
| Long period absentee (restricted subs) | 8 | 7 |

In the above table, no mention is made of "directory numbers" of non-numerical P. B. X groups and of changed numbers and dead lines, because these can never be busy and therefore their condition always remains the same.

8. When comparing Tables I and II, it will be seen that in each case two impulses are delivered in a complete cycle of 1100 impulses for any line, whether this is free or busy, so that the complete indication of the identity condition and class of the line is received only after these two impulses have been registered.

9. It may be observed from Table II, that for the first lines of non-consecutive P. B. X groups, when they are busy, the identity of the P. B. X group is not lost because this remains supplied from terminal B. For the other lines of such a group, however, the P. B. X identity is lost when busy, and in this case, they supply the same indication as a busy single line. In other words, the P. B. X identification will be present only either on the first P. B. X line or on other lines which are free, so that hunting may be effected by hunting for the particular impulse source identifying a wanted P. B. X group.

10. In the case of a P. B. X group with consecutive numbers, all lines but the last, when busy, will continue to supply an impulse to terminal B from source P*d*11, and as this is the characteristic indication of a line of a group of this type, the fact that this is received, together with an impulse from source P*d*8, which indicates this line to be busy, will cause the register to hunt for the next line in the group. The last line of this group, when busy, however, provides the same indication as a busy single line, so that when it is selected, either directly, or after a preceding line has been selected, it will return the indication to the register that the busy signal has to be given to the caller.

From the above it will be clear that the exploring operation, which takes place for a final selector as soon as the tens and units digits have been received, is such that the register will await the receipt of two impulses, one of which is supplied from terminal B, and the other of which may be supplied from terminal A, in case the line is free, or from a line finder or final selector, in case the line is busy. These two impulses are characteristic of the same line and occupy two out of the eleven time positions in the cycle of 1100 time positions. When these two impulses have been received at the register, all information that is necessary to handle the different types of calls has been provided, as will now be explained.

*Single line free.*—The operation of the final selection relay F*sr* in the register connects a combination of impulse sources to the comparator over its front contact F*s*3, which combination is characteristic of the tens and units combination of the line to be selected. This circuit may be traced from the switches in the called number register device CNRD (Fig. 8), break contact I*a*2, make contact F*s*3, make contact L*a*3, break contact H*r*4, break contact O*k*2, rectifier RG1, resistor, to the CW wire. In consequence thereof, the register will accept impulses only at time units corresponding to this line, and for each line two impulses are supplied in time units also corresponding to the sources P*d* which happen to be connected to the explorer for this line. The comparator in the register also includes detecting and registering equipment for the P*d* characteristics of the two impulses.

When the F*sr* relay operates, it opens break contact F*s*4 in the circuit between the tube V*g* and the CW wire, thus disconnecting the anode of the tube V*g* so that it cannot prevent another impulse from reaching the gas tubes. Thus more than one impulse will be admitted.

In order to record the P*d* impulses, a set of tubes V*d*1 . . . 11 are provided which are similar to the other tubes and have their control electrodes connected through individual rectifiers to pulse sources R*d*1 to R*d*11, respectively. The anode circuits of all of these V*d* tubes are connected together and via a make contact F*s*7 of the F*sr* relay to the make contact B2, together with the other gas tube anode circuits. The tubes V*d* have individual relays designated respectively D*ar* . . . D*kr* connected to their anode circuits.

The first impulse produced at the cathode of tube AT4 will identify the called line and will operate one each in the groups of gas tubes V*a*, V*b*, *and* V*c*. Since this impulse will occur in the time position of a P*d* impulse, one of the V*d* tubes will also operate. The second impulse will correspond to the first impulse with respect to the identity of the called line, but will occur in a different P*d* time position. This second impulse will, therefore, have no effect upon the tubes V*a*, V*b* and V*c*, even if additional ones of these tubes could be operated, but will operate another of the tubes V*d*, so that now two of the V*d* tubes will be operated.

In order to terminate the receipt of impulses after the two V*d* tubes have been operated, a relay T*pr* is provided (Fig. 10). This relay is arranged to operate only after any two of the relays D*ar* to D*kr* have operated. One manner of accomplishing this is to provide relay T*pr* with two windings. The right hand winding is connected between battery and ground over the parallel arrangement of all the first make contacts of relays D*ar* to D*kr*. The other winding is connected between battery and ground over the parallel circuits of the second make contacts of relays $Dar$ to $Dkr$, each in series with an individual resistor. The windings oppose each other and have such resistances and the resistors in the circuit therewith are of such a value that one resistor in series with the left hand winding will draw a current which will just balance the current in the right hand winding, and the relay will not operate. When two or more resistors are in parallel, however, as when two or more of the relays are operated, the current in the left hand winding is sufficiently greater than that in the right hand winding to operate the relay.

Make contact $Tp1$ bridges contact $Fs4$ and connects the anode of tube $Vg$ to the CW wire when relay $Tpr$ is operated, thus causing the negative potential to be supplied to the CW wire to absorb the incoming pulses.

In the case of a single, free, unrestricted line, Table I shows that sources $Pd11$ and $Pd6$ are applied, respectively, to terminals A and B, so that as a consequence thereof (and remembering that the impulses received by the gas tubes are delayed by one time impulse) tubes $Vd1$ and $Vd7$ at the register will function, corresponding to these two sources. The slave relays $Dar$ and $Dgr$ of the two tubes operated need have no contacts in the control circuit, since operations in the register for continuing the setting up of the connection will automatically proceed. As the combination of sources indicates a free line, the register may proceed immediately with the through connection of the individual final selector to this line, and for this purpose has to engage that part of the "ESBO" circuit which contains the magnets controlling the operation of the mechanical switch.

The impulses which operate the above-mentioned gas tubes are received from the final selector "ESBO" circuit of Fig. 6 over the wire 1 and are applied to the grid of the tube ST, since relay $Tgr$ is operated and relay $Okr$ is unoperated. It will be understood that over this lead 1 will come all of the impulses representing the outlets of the final selector, the time position of these impulses with respect to the $Pa$, $Pb$ and $Pc$ impulses representing the individual outlets, and the consecutive positions of these outlet-identifying impulses in the eleven repeated cycles caused by the application of the checked two $Pd$ impulses representing the condition and class of the outlet.

A combination of the impulses $Pa$, $Pb$ and $Pc$ are applied to the rectifier RG1 from the called number registering device CNRD over break contact $Ia2$, make contact $Fs3$, make contact $La3$, break contact $Hr4$ and break contact $Ok2$. By means of this gating circuit all of the impulses not coinciding with those applied over the circuit just mentioned will be absorbed, and therefore only the impulses identifying the called line will pass down the wire CW to be applied to the grid of tube AT3 in the time position following the time position of each impulse, as has already been described. The train of tubes AT3, FT2, FT1, and AT4 will operate, as already described, and the impulses will be delivered from the cathode of tube AT4 to the inputs of the various tubes $Va1$ . . . $Va5$, $Vb1$ . . . $Vb5$, $Vc1$ . . . $Vc4$, $Vd1$ . . . $Vd11$, $Ve1$ . . . $Ve3$, and $Vg$. A combination of the relays $Aar$ . . . $Aer$, $Bar$ . . . $Ber$, $Car$ . . . $Cdr$, $Dar$ . . . $Dkr$, $Ear$ . . . $Ecr$, will operate, depending on the time position of the first received impulse. Also, tube $Vg$ will operate and its accompanying relay $Fr$.

The combination of the $Car$ to $Cdr$ relays will prepare a circuit for the operation of either of relays $Dr$ or $Er$ and either of relays $Lr$ or $Mr$. At the same time circuits are prepared over the contacts of the combination of operated relays for the code bar magnets FAM, FBM, FCM, FDM, FEM, in the final selector "ESBO" circuit over wires 3 to 7, inclusive.

The operation of relay $Fr$ shorts the winding of relay $Br$ at make contact F2, thus starting the slow release of relay $Br$.

The operation of relay $Fr$ also operates relay $Sir$ over make contacts B1 and F1 and break contact $Fs5$. $Sir$ relay operates relay $Tdr$ over make contact $Si1$ and make contact $Tg2$ which in operating further prepares the circuits for the code magnets by the closing of make contacts $Td1$ to 5.

The operation of relay $Sir$ also closes the circuit for slow-to-operate relay $R'r$ at make contact $Si5$, but this relay does not operate if relay $Tr$ operates, as explained below.

The operation of the $Sir$ relay also completes a connection from wire 9 to the sequence test circuit in the register (Fig. 10), so that 24 volts battery is applied from the final selector "ESBO" circuit over the make contacts D2 and E2 in parallel, a resistor, break contacts C'6, $SVa1$, $SVb1$ in the "ESBO" circuit, over wire 9 and the contact 9 of the "ESBO" connector switch, make contact $Tg4$, break contact $Ch7$, make contact $Si2$, make contact $La4$, break contact $Ok9$, to the grid of tube AT5 via the gating circuit already described. This provides the double test feature to permit only one register to act on the "ESBO" equipment at a time, and if this test is successful, the tube $Vs$ will operate, in a manner already explained, together with relay $Tr$.

The relay $Tr$ in operating closes the circuit already prepared for either relay $Dr$ or $Er$ and either relay $Lr$ or $Mr$, which now operate. At the same time, a circuit is closed for relay $Tcr$ over make contact $Tg1$, make contact $Td6$, and make contact T2, to ground. The circuit for relay $R'r$ is opened at break contact T8, so that that relay cannot operate.

Relay $Tcr$, in operating, closes its contacts $Tc1$ to 5 and thus connects the code bar magnets FAM . . . FEM to the already prepared circuits for operating them. Accordingly, a combination of these code bar magnets will operate, depending on the $Aar$ to $Aer$ and $Bar$ to $Ber$ relays which have been set up by the received impulses. As already explained, the operation of a combination of the code bar magnets selects a pair of vertical bars in the final selector switch but does not operate them.

The locking circuit for the code bar magnets is now closed by those of contacts $fam1$ to $fem1$ which have operated, and a circuit is thus closed from the code magnet operating grounds in the register circuit, over these code magnet contacts, relay $Cr'$, wire 8 to the "ESBO" connector switch, contact 8 of the connector switch, make contact $Tc8$, make contact D1 or E1, depending on which of relays $Dr$ and $Er$ is operated, make contact L1 or M1, depending on which of relays $Lr$ or $Mr$ are operated, winding of relay $Hrr$, to battery and ground. The $Hrr$ relay operates in this circuit, as already explained in connection with the third group selector, but the $Cr'$ relay does not operate because of its low resistance. Relay $Hrr$ locks to ground over its make contact $Hr1$ and make contact $Tc6$, thus applying ground to the wire 8.

The operation of relay $Hrr$ also removes the ground at $Hr2$ from the operating circuit of relay $Br$ which has already started to release by having its winding shorted by F2.

When relay $Br$ releases, it opens the circuits of all of the tubes $Va1$ . . . $Va5$, $Vb1$ . . . $Vb5$, $Vc1$ . . . $Vc4$, $Vd1$ . . . $Vd11$, $Ve1$ . . . $Ve3$ and $Vg$, and their accompanying relays at make contacts B2 and B6, and these tubes and relays are de-energized and released. The removal of the grounds on the operating circuits of the code magnets by the release of the relays just referred to causes the operation of the relay $Cr'$ in the holding circuit of the code magnets in Fig. 6, these magnets now being held to the ground at $Tc6$ over make contact $Hr1$. Relay $Hrr$ is also held by this same circuit.

The operation of relay $Cr'$ opens the test connection on wire 9 at break contact C6, and thus removes the positive potential from the test wire. Also, wires 3 to 7 are changed over by means of contacts C'1 to C'5 from the code bar magnets to other circuits which will be explained later.

The release of relay B$r$ also releases relay S$ir$ by the opening of make contact B1. Relay S$ir$ in releasing, releases both relays T$dr$, at make contact S$i$1, and T$r$, at make contact S$i$4, so that these two relays release. The release of relay T$dr$ disconnects wires 3 to 7 from the operating circuits of the code magnets and connects them to other circuits to be later explained.

The combined releasing of relays T$dr$ and T$r$ causes the operation of relay C$gr$. This circuit, as before, can be traced from —48 volt battery, winding of relay C$gr$ (Fig. 10), break contact T3, break contact T$d$5, make contact T$c$5, contact 7 of the connector switch to wire 7, leading to the final selector "ESBO" circuit (Fig. 6), make contact C'5, make contact D'4, make contact E'4, a resistor, to —150 volts. The difference in voltage between —150 volts at one end and —48 volts at the other end operates the C$gr$ relay, which, in operating, operates its helper relay C$hr$ over make contact C$g$1.

The C$hr$ relay in operating closes a circuit for one of the vertical servomagnets SV$a$ and SV$b$, depending on whether relay L$r$ or M$r$ has been operated. These two circuits may be traced from battery, windings of servomagnets SV$a$ and SV$b$, make contacts C'1 and C'2, break contacts SV$b$2 or SV$a$2 wires 3 or 4 to the "ESBO" connector switch, contacts 3 or 4 of the switch, make contacts T$c$1 or T$c$2, break contacts T$d$1 or T$d$2, make contacts L2 or M2, and make contact C$h$1. The operation of the selected servomagnet moves one of the vertical bars of the selected pair.

At the same time the operation of relay C$hr$ will cause the release of one of the relays E$r$' and D$r$' in the final selector "ESBO" circuit, depending on which of relays D$r$ and E$r$ in the register circuit has been operated. Relays E$r$' and D$r$', as will be seen, are connected, respectively, over make contacts C'3 and C'4 and make contacts D'3 and E'3 to wires 5 and 6 leading to the "ESBO" connector switch, and through that switch over make contacts T$c$3 and T$c$4, respectively, and break contacts T$d$3 and T$d$4, respectively to the armatures of contacts E2 and D2, respectively. Whichever one of these is operated will connect its associated wire to ground through make contact C$h$2. This will connect ground to both terminals of the winding of the selected relay and cause it to release. The release of either of relays E$r$' or D$r$' will break the circuit for the operation of relay C$gr$ in the register by the opening of either make contact D'4 or E'4.

The release of relay C$gr$ in the register applies ground to the "C" wire (Fig. 8), from break contact H$c$1, make contact C$h$3, and break contact C$g$2, and this ground is led through the conversational chain, including the several group selectors to the "C" wire in the final selector circuit of Fig. 5, through the break contact HB2 in the final selector circuit, horizontal magnet HM, to battery in the final selector "ESBO" circuit (Fig. 6). This operates the horizontal magnet HM which is individual to the inlet of the final selector and tells the final selector which inlet is to be connected to the selected outlet. The operation of the HM magnet informs the register of this fact by closing a circuit from ground at make contact H1, over break contact HB1, wire "$d$," through the group selectors to wire "D" in the register, winding of relay H$cr$ to battery, and thus operating relay H$cr$.

The operation of relay H$cr$ removes ground from the "$c$" wire at break contact HC1, which ground originally operated the HM magnet. However, ground is now supplied on the "$e$" wire of the final selector from the previous selector through make contact H2 to the HM magnet, so that this magnet is now held over the "$e$" wire from the preceding selector.

The operation of relay H$cr$ also closes the circuit for slow-to-operate relay R'$r$ at make contact H$c$5, but this relay is prevented from operating at this time by the subsequent operation of relay T$r$ in a manner to be described later.

The release of the C$gr$ relay also connects the sequence test circuit in the resistor (Fig. 10), to either wire 5 or 6, depending on which of relays E$r$ or D$r$ have been operated. This circuit may be traced from the gating circuit connected to the grid of tube AT5 in the sequence test circuit, the resistor connected thereto, through the point Q, break contact D$f$'1, break contact C$g$3, make contact C$h$4, either of make contacts D3 and E3, depending on which of relays D$r$ and E$r$ has been operated, the break contact No. 2 of the other of these relays, break contacts T$d$3 or T$d$4, make contacts T$c$3 or T$c$4, contacts 5 and 6 of the "ESBO" connector, this circuit being extended over break contacts D'3 or E'3, depending on which of the D$r$' and E$r$' relays has been released, to contacts VB$a$ and VB$b$, controlled by the vertical bar which has been operated, and thence to the "$c$1" wire of the particular outlet of the final selector which has been selected.

The fact that one of the relays D$r$' and E$r$' is released (these relays being normally operated in series with a resistance to battery) is indicated by the disconnection of the —150 volt potential from wire 7 and the release of relay C$gr$ in the register, which signals to the register that it may now test the "$c$" lead of the wanted line. It is for this purpose that the "$c$" lead of the wanted line is connected via the contact on the operated vertical bar corresponding to the wanted line, to either wire 5 or 6, depending on whether D$r$' or E$r$' was released, and is thus extended at the register to the electronic sequence test arrangement.

The purpose of this test is, in the first place, to ascertain that the wanted line is not in calling condition at this moment, this calling condition manifesting itself by a change of potential on the "$c$" wire which will prevent the sequence test arrangement at the register from functioning. It may happen that, after the register has recorded the condition of the wanted line as being free by means of the explorer, the wanted subscriber originates a call, so that by the time the switch attempts to complete its through-switching action, the called subscriber actually is already on the line, in which case preference should be given to the newly originated call and the wanted line should be marked as busy. Other reasons for making this test on the "$c$" lead of the subscriber's line will appear hereafter.

If a called line is still in the free condition, the potential of the "$c$1" wire will be sufficient to operate the tube AT5 in the sequence test circuit, whereupon the tube VS will ionize and the relay T$r$ will operate in the same manner as previously described. The operation of the relay T$r$ will cause the operation of one of the horizontal servomagnets S$hc$ and S$hd$ in the final selector "ESBO" circuit, depending on which of the relays DR' and ER' is unoperated. If relay E$r$' is unoperated, the circuit will be completed for horizontal servomagnet S$hd$ over break contact E'4, make contact D'4. If relay D$r$' is unoperated, the circuit will be completed for horizontal servomagnet S$hc$ over break contact D'4. Both of these circuits will be completed over make contact C'5, wire 7, contact 7 in the "ESBO" connector switch, make contact T$c$5, break contact T$d$5, make contact T3, and make contact H$c$2. The operation of the horizontal servomagnet moves the selected horizontal bar (not shown) in the direction depending upon which of the two horizontal servomagnets is operated. The operation of the horizontal bar closes the individual contacts A to E in the final selector switch and connects through to the called line.

The operation of the horizontal bar opens break contacts HB1 and 2. The latter disconnects the horizontal magnet HM from the "$c$" lead, so that this lead can be connected cleanly through to the called line.

The operation of the horizontal bar also signals the register that it may disconnect the operating circuit of the horizontal magnet and also that it may disconnect itself completely from the "ESBO" circuit by releasing its "ESBO" connector. This is accomplished by the opening of break contact HB1 in the final selector circuit which disconnects ground from the "d" lead. Thus, ground is removed from the operating circuit which extends through the conversational chain on the "d" lead, and the relay H*cr* in the register is released. The release of the relay H*cr* releases whichever horizontal servomagnet S*hc* or S*hd* is operated by removing the ground on the No. 7 wire at H*c*2 in the register circuit, so that this servomagnet releases, without, however, releasing the horizontal bar which is locked in its operation position.

The release of the relay H*cr* also operates relay O*kr* over break contact H*c*3, make contact C*h*5, and break contact C*g*4. The operation of relay O*kr* releases relay F*sr* by removing the ground at O*k*3 in its locking circuit including make contact F*s*1. Release of relay F*sr* releases relay T*gr* in the "ESBO" connector switch, (Fig. 11), and the release of relay T*gr* disconnects wires 1 and 9 from the final selector "ESBO" circuit by opening make contacts T*g*3 and T*g*4.

The operation of relay O*kr* also operates relay R*lr* over make contact O*k*5, make contact T*r*7, break contact H*c*4, break contact B5, break contact H*s*4, to ground.

The operation of relay R*lr* breaks the holding circuit at break contact R*l*3 for horizontal servomagnets SH*a* or SH*b* of the "ESBO" connector, whichever one was operated, and also relay L*ar*, thus releasing these two relays. Also, the operation of R*lr* opens the holding circuit of relay T*cr* at the break contact R*l*2 and relay T*cr* releases.

The release of relay T*cr* releases relay H*rr* by opening make contact T*c*6; releases relay C*r*′ in the final selector "ESBO" circuit by opening make contact T*c*8, simultaneously releasing the combination of code bar magnets FAM to FEM which were operated; releases relay C*hr* by opening make contact T*c*7; and releases whichever of the servomagnets S*va* and S*vb* was operated by opening make contacts T*c*3 and T*c*4.

The release of relay C*hr* releases tube VS and relay T*r* by the opening of make contact C*h*8, and releases relay O*kr* by the opening of make contact C*h*5.

The release of relay T*r* releases whichever ones of the relays D*r*, E*r*, L*r* or M*r*, that were operated, by the opening of make contact T1, and by the opening of make contact T7 breaks the holding circuit for relay R*lr* which releases slowly.

When the R*lr* relay has finally released, the "ESBO" connector and the "ESBO" circuit for the final selector have been released and can be used for another operation.

When the final selector is connected to the called line, a −48 volt potential through a low resistance will be provided through the "c" conductor from one of the preceding selector circuits, which fixes the potential on the subscriber's "c" wire at practically full 48 volts, so that when the called subscriber answers, he will not be able to operate the call detector (not shown) by changing the potential on the "c" wire, owing to the closure of the loop via "a" and "b" wires.

The subscriber's "d" conductor is now connected at the final selector to source P*d*8 via make contact H3, and this source acts to change the condition at the individual point representing the called line on the "ESBO" explorer circuit.

In the case now considered (single line), only the impulses supplied to terminal A of this explorer will be absorbed by source P*d*8, so that the impulses P*d*8 replace the impulses supplied by source P*d*11 to the explorer in the case of a single line. The impulses supplied via terminal B (from P*d*6 or P*d*7 for an unrestricted and a restricted subscriber, respectively), will not be affected by P*d*8. The disconnection of the register from the "ESBO" circuit causes this circuit to return to its original condition, as already explained, by the release of the code bar magnets and the two operated servomagnets, as well as relay C*r*′, whereas whichever of relays D*r*′ and E*r*′ which was de-energized now returns to the operated condition.

It will be noted that the sequence test circuit of Fig. 10 makes a number of tests in connection with the "ESBO" circuit connected to it at the time. Each time prior to the test, the R′*r* relay tries to operate, but is prevented from operating by the operation of the T*r* relay if the test is successful. If the test is not successful, the R′*r* relay operates and breaks down the various associated circuits.

The manner of accomplishing this is as follows: When the third group selector "ESBO" circuit has been connected to the register, a test is made to determine whether this "ESBO" circuit is free. The previous operation of relay S*ir* closes a circuit for relay R′*r* which can be traced from grounded battery, winding of relay R′*r*, make contact S*i*5, break contact T8, break contact R*l*6 to ground. Since relay R′*r* is a slow-to-operate relay, it does not come up immediately and when relay T*r* operates, the operating circuit for relay R′*r* is opened at break contact T8, so that relay R′*r* cannot operate at this time.

A subsequent test is made to determine if the selected outlet of the third group selector is free. Previous to this test, the H*cr* relay is operated and has closed a circuit for the R′*r* relay through make contact H*c*5, instead of make contact S*i*5. If this test is successful, the T*r* relay operates and again opens the energizing circuit for relay R′*r* at break contact T8 before relay R′*r* has a chance to operate.

When the proper "ESBO" connector has been selected for making connection to the selected final selector "ESBO" circuit, the operating of relay S*ir* again closes the circuit for relay R′*r*, but the subsequent operation of relay R*lr* opens this circuit and prevents relay R′*r* from operating. Again when the "ESBO" connector connects to the final selector "ESBO" circuit, the release of relay R*lr* closes the circuit for the R′*r* relay at break contact R*l*6, but the subsequent release of relay S*ir* opens this circuit at make contact S*i*5 and prevents the operation of relay R′*r*.

When a test for a free final selector outlet is made, the operation of relay S*ir* again closes the circuit for relay R′*r* at make contact S*i*5, but the subsequent operation of relay T*r*, if the test is successful, opens the circuit again at break contact T8 before relay R′*r* has had a chance to operate.

When the second test is made over wires 5 or 6 to determine if the selected final selector outlet is still free just before making the connection, the H*cr* relay closes the circuit for R′*r* relay by make contact H*c*5, but relay R′*r* is prevented from operating by the operation of the T*r* relay, if the test is successful.

Assuming that any one of the various tests referred to above is not successful and that relay T*r* does not operate, then relay R′*r* will operate and will thus close a circuit for the operation of relay R*lr* at make contact R′1.

The operation of the R*lr* relay, as before, will release whichever one of the horizontal servomagnets SH*a* and SH*b* that was operated in the "ESBO" connector switch by the opening of break contact R*l*3. Relay L*ar* is also released by the opening of this circuit.

Relay T*cr* is also released by the opening of break contact R*l*2. Relay T*cr* releases the following relays: relay H*rr* by the opening of make contact T*c*6, relay C*r*′ in the "ESBO" circuit and also those of the operated code bar magnets F*am* to F*em* by the opening of make contact T*c*8, and relay C*hr* by the opening of make contact T*c*7. The release of relay H*rr* releases the relays D*r* or E*r* and L*r* or M*r* by the opening of make contact H*r*3.

The operation of relay R*lr* opens the circuit for relay R′*r* at break contact R*l*6, which releases and opens the circuit for relay R*lr* at make contact R'1. Relay R*lr* will release after a time, since it is slow to release. When relay R*lr* is released, the circuit is in its original condition.

*Call to a busy single line.*—In the case of a call to a busy single line, the operation initially is as described for a free single line, but the two signals that are transmitted from the explorer at the "ESBO" circuit for this line to the register are now received in time units corresponding to the impulse periods of source P*d*8 and either P*d*6 or 7. The fact that an impulse is received from source P*d*8 immediately marks the line as inaccessible, and the fact that this is combined with an indication from either source P*d*6 or 7 indicates that this is the case of a line for which no P. B. X hunting should take place. Because of the one time unit delay, the receipt of these two impulses will reoperate relay D*ir* and either relay D*gr* or relay D*hr*. Accordingly, the register, upon having received this indication, will immediately cause the connection of a busy tone to the calling subscriber by sending the appropriate signals for purpose to the cord circuit, for example, over make contact D*i*3, and either make contact D*g*3 or make contact D*h*3, (upper left corner of Fig. 8), which will cause the whole train of selectors beyond the first group selector to release. The individual final selector switch has not in any way been operated.

*Call to a free list P. B. X-line with non-consecutive numbers.*—The operation initially starts as in the case of a single line, but the impulses received from the type of line now considered when the final selector has been connected will fall in the times corresponding to the impulse periods of source P*d*6 or 7 (depending on whether the P. B. X group has unrestricted or restricted service facilities), and one of sources P*d*1 to 5, which indicates the fact that the called line belongs to one of a number of P. B. X groups having these characteristics.

On account of the fact that the P. B. X characteristic is received in combination with an impulse from either source 6 or 7, the fact is signalled that the line is free and, therefore, the operated combination of relays D*gr* and D*hr* with one of relays D*br* to D*fr* will not prevent the functioning of the circuit, and the register may proceed in exactly the same manner as described for a call to a single free line.

*Call to P. B. X group with non-consecutive numbers of which the first line is busy.*—In this case the register receives from the explorer two impulses which according to Table No. II comprise any one of sources P*d*1 . . . 5, indicating that the line belongs to one of a number of P. B. X groups of the type now considered, whereas the other impulse received corresponds to the source P*d*8. The receipt of an impulse in a time corresponding to source P*d*8 signifies the line as being busy, but this fact, combined with the fact that an impulse is received in one of the times corresponding to sources P*d*1 . . . 5 indicates that the call has been directed to a first P. B. X line, so that the register must now initiate a hunting action. It does this in the following manner:

One of the relays D*br* to D*fr* will be operated together with relay D*ir*. The combination of these two relays will operate relay I*ar*, in a circuit including the winding of relay I*ar*, make contact D*i*4, make contact 3 of the respective D*br* to D*fr* relay operated, to ground. Relay I*ar* will lock over make contact I*a*1 and make contact F*s*8 to ground.

One of the impulses from sources P*d*1 . . . 5 which characterizes the identity of the P. B. X group, is recorded at the register by the operation of one of the relays D*br'* to D*fr'* over make contact 2 of the corresponding D*br* to D*fr* relay and causes the connection to the comparator at the register of the corresponding one of the sources P*d*1 . . . 5, over the respective make contact D*b'*1 . . . D*f'*1 and make contact I*a*2. At the same time the sources, which up till now indicated the combination of tens and units digits, according to which the explorer was made to signal the condition of the wanted line, are disconnected from the comparator by the opening of break contact I*a*2.

Meanwhile when tubes V*a*, V*b*, V*c*, V*d*, V*e* and V*g* operate with their associated relays, relay S*ir* is prevented from operating by break contact F*s*5 and does not operate until the second D*ar* to D*kr* relay operates, (which, it will be remembered, operates relay T*pr*), when the circuit for relay S*ir* is closed by make contact T*p*2 which bridges break contact F*s*5. Relay S*ir* then operates from grounded battery, winding of relay S*ir*, make contact B1, make contact F1, make contact T*p*2, to ground. However, in the case under consideration, the operation of relay D*ir* releases relay B*r* at break contact D*i*6, and the release of relay B*r* releases all the V*a* . . . V*g* tubes and their associated relays. The release of relay D*ir* reoperates relay B*r* again at break contact D*i*6, and the register is again ready to receive pulses from the explorer circuit of the final "ESBO" circuit.

The exploring operation, therefore, continues now in such a manner that the register will accept impulses exclusively which are sent in those time units which correspond to the impulse periods of that one of sources P*d*1 . . . 5 which is connected as a reference source to the comparator at the register circuit and which source corresponds to the P. B. X group wanted.

Any line in the hundreds group which is free and which belongs to the wanted group of P. B. X lines will now be able to signal its free condition by the fact that it is capable of supplying an impulse from the corresponding P*d* source, via its terminal A. Busy lines of this P. B. X group will not be able to signal an impulse from this P*d* source, via terminal A, because the impulse, via terminal A, is suppressed by the presence of source P*d*8 on the "*d*" lead of a busy line. As a consequence thereof, the register will now accept an impulse only from free lines of a wanted group, and if any one of these lines sends an impulse, the register responds to it and records its time of arrival within the P*d* cycle concerned, which is characteristic for the identity of this line. This recording is done, as before, by operating the V*a*, V*b*, and V*c* tubes and their associated relays. Once this record has been taken at the register, the register considers this as the number of the wanted line instead of the number which was dialed originally, and from now on it proceeds to connect to this line in precisely the same manner as has been described in conjunction with a single free line.

It will be observed that all of the hunting operations happen without any mechanical action taking place on the multi-switch for the call under consideration. This means that the multi-switch may be acted upon for other calls during this time.

*All lines of P. B. X group with non-consecutive numbers busy.*—In case all lines of a P. B. X group with non-consecutive numbers are busy, hunting will start in the same way as described above, but the register will not receive any impulses in the P*d* cycle characteristic for the wanted P. B. X group and which commences in the time unit following the characteristic time of the first P. B. X line in this cycle. When, therefore, all lines of the group have been unsuccessfully investigated for the presence of an impulse from the P*d* source characterizing the wanted P. B. X group, finally, after one complete cycle of 1100 time units, an impulse will be received from the first P. B. X line which produces this impulse always, even if it is busy. The register, therefore, responds again to an impulse produced in the corresponding P*d* cycle by the first P. B. X line and accordingly stops P. B. X hunting and attempts to connect through to this line, because at this stage of the operation, the register is not able to distinguish whether the P*d* impulse received is one corresponding to a free line of a group or whether it was originated by the first line, whether free or busy.

It will be clear that the first P. B. X line is not able to indicate whether it is free or busy by means of the explorer, because during P. B. X hunting the register will respond exclusively to impulses sent from one of the sources P*d*1 . . . 5, characterizing the wanted group, owing to the operated condition of the I*ar* relay. However, in receiving this impulse, the register records its time of arrival in the same way, as described in connection with a successful hunting operation in the preceding paragraph, and proceeds with an attempt to connect through with the line in question.

As described in connection with a call to a single free line, one of the operations the register carries out before connecting-through to this line is to check on the subscriber's "*c*" lead for a possible busy condition, and in the case now considered, when no P. B. X lines were free and the register has responded to a P*d* impulse from the first P. B. X line, the register will find this first P. B. X line busy when making this test on the "*c*" lead. Accordingly, the register, by the operation of the R'*r* relay, in the same manner as for the case it finds a line busy as a result of the electronic exploring operation, will cause busy tone to be connected to the caller and release all switches beyond the first group selector. The final selector switch is in no way operated.

*Direct selection of line other than first of P. B. X group with non-consecutive numbers.*—For night switching purposes it may be necessary to make subscribers dial directly some of the other lines of a P. B. X group which, if busy, should not initiate hunting. This is provided for in the following manner:

When a line of this type is called directly when free, it transmits the same signals to the register, as described in connection with the first line of the group when this was free, and the register accordingly acts in the same way as for a free single line.

However, when a line now under consideration is called directly when busy, the signals transmitted to the register are those provided from a combination of sources P*d*6 or 7 and P*d*8, as may be seen from Table No. II, and accordingly the signals received correspond to those of a busy single line, so that the register will act as described for that case.

*Call to "directory number" of non-numercial P. B. X groups.*—This number is characterized by the presence of sources P*d*6 and 7, which combination informs the register that it deals with a call of this type, so that it now acts as follows:

In the first place, the register operates, in the same way as described for a single line, a combination of relays A*ar*—A*er*, B*ar*—B*er*, C*ar*—C*dr*, E*ar*—E*cr*, and relays D*gr* and D*hr*, a combination of code bar magnets at the "ESBO" circuit, and one of the vertical servomagnets, at the same time short-circuiting one of relays E*r*' or D*r*', so that one vertical bar is lifted and a circuit is established, via either wire 5 or 6 and one of the contacts VB*a*1,2; VB*b*1,2.

Because no line equipment is provided for this number, the point in question, which normally is connected to the "*c*" conductor of the subscriber's line, is not connected to a physical subscriber's line circuit, but instead of this, it is connected to a group of four rectifiers which are represented in Fig. 6 and each of which is connected to a combination of sources P*a*, P*b*, P*c* and P*d*. A different combination of these sources is provided for each of the P. B. X groups of this type, provided in the exchange, and accordingly for each of the corresponding directory numbers an impulse will be provided to either wire 5 or 6 at a characteristic time in accordance with the sources connected.

The sources provided permit of a maximum of 1100 different combination, which is considered sufficient for an exchange with even a very large number of P. B. X's.

When relays D*gr* and D*hr* operate, they operate relay D*g*'*r*, (lower center Fig. 10), in a circuit from grounded battery, winding of relay D*g*'*r*, make contacts D*g*4 and D*h*4, to ground. Relay D*g*'*r* locks over make contacts D*g*'1 and F*s*6. The circuit then proceeds in the manner already described, operating a combination of the code bar magnets FAM to FEM and eventually operating relay C*hr* to operate vertical servomagnet SV*a* or SV*b* which lifts one of the vertical bars. Upon the operation of relay C*hr* a circuit is closed for the operation of relay D*f*'*r* from grounded battery, winding of relay D*f*'*r* make contact D*g*'2, make contact C*h*9, to ground. This disconnects contact C*g*3 from the sequence test circuit and connects it to an auxiliary register circuit over make contact D*f*'1. This auxiliary register circuit may comprise a plurality of tubes and relays similar to the tubes V*a*1–5, V*b*1–5, V*c*1–4, V*d*1–11, V*e*1–3, and relays A*ar*—A*er*, B*ar*—B*er*, C*ar*—C*dr*, D*ar*—D*kr*, E*ar*—E*cr*, with suitable locking circuits to register the identity of the non-numerical P. B. X group by the operation of a combinaiton of these relays.

The register, therefore, upon having caused the operation of the vertical bar, provides a potential via either wire 5 or 6, by means of which it investigates the condition of sources just referred to and thereby is able to obtain a record in the auxiliary register circuit of the identity of the non-numerical P. B. X group concerned. After having obtained this record, slow-to-operate relay R'*r* operates over make contact D*f*'2 and operates relay R*lr* over make contact R'1 which releases the whole of the connection established thus far and starts setting up a new connection via a different train of switches, following the principle described in British Patent No. 678,-319 of December 22, 1952. This happens under the control of the record taken at the register of the P. B. X group's identity.

The "ESBO" connector, therefore, is also released immediately after the record of the wanted P. B. X has been taken via either conductor 5 or 6, which, as may be observed normally in other cases, is employed for investigating the condition of the subscriber's "*c*" wire, before connecting through the final selector to a wanted line.

In the case now under consideration, the final selector is not connected through, because only the vertical bar of the mechanical switch had been lifted, but no movement of a horizontal bar took place, the operation of the vertical bar alone being sufficient to provide access to the individual point of the selected number, which would normally be connected to the "*c*" wire. It will be seen, therefore, that the test for the identity of the non-numerical group takes place with the multi-switch in the condition in which it otherwise makes the "*c*" wire test of the condition of a subscriber's line.

*Call to P. B. X with consecutive numbers.*—There may be an unlimited number of P. B. X groups of this type, except for reasons of capacity, in any group of a hundred lines, and each of these groups provides the same indication to the register, as shown in Table No. I, i. e., either P*d*6 plus P*d*11 or P*d*7 plus P*d*11.

When a line of such a group is selected when free, the register responds to the combination of impulses received in the same way as for a single line, because in fact there is no difference in the P*d* cycles of these impulses received in the two cases.

In case any line but a last of this type is selected when busy, the impulses received arrive in P*d* cycles 8 and 11, and this particular combination, by operating relays D*ir* and D*ar*, indicates to the register that it deals with a busy line of a P. B. X group of the type now under consideration, so that it must switch-over the comparator to the next line. Relays D*ir* and D*ar* operate relay N*ur* (center left edge of Fig. 8), over make contacts D*i*8 and D*a*3, which, by its make contact N*u*1, operates the stepping device SD in the registering device CNRD, which causes the connection of the reference sources to the comparator to be so modified that they correpsond to a time unit associated with the next line in the hundreds group. Meanwhile, since relay T*r* has not operated, because of the busy condition of the selected outlet, relay R'r operates and the register returns to the condition in which it is ready to receive a new series of control impulses, and after this, the selecting operation is repeated. This may be repeated again if on this second operation the next line is again found to be busy and not the last of the group.

If, however, the next line selected is the last of the group, this has the same characteristic sources connected, and in the same way, as a single line, so that the register will behave exactly as for a single line, depending on whether it finds it free or busy. This means that when the last line is also found busy, busy tone will be returned to the caller and no further hunting will take place.

It will be observed that all of the hunting operations happen without any mechanical action taking place on the multi-switch for the call under consideration. This means that the multi-switch may be acted upon for other calls during this time.

*Calls to 4-party lines on a "terminal per station" basis.*—Four different combinations have been reserved for this case on the assumption that each of the subscriber's numbers allotted to one of the four stations on a 4-party line will be given a different one of these four combinations. When one of these numbers is selected, the register receives the corresponding combination and thereby knows that it deals with a party line, so that it may cause the connection of the proper type of ringing current according to the combination received. Thus, the relay D*kr* will operate together with one of relays D*gr*, D*hr*, D*jr*, and D*ar*, and by means of make contact D*k*4 (upper left Fig. 8), and one of make contacts D*g*5, D*h*5, D*j*3, and D*a*4, a signal is sent to the cord circuit to produce the proper ringing current.

*Call to long period absentee line.*—Lines that are in absentee condition for a long period provide one of the combinations of impulses listed in Table No. I for this class of line, and the register, upon receiving this combination, causes the connection to be broken down and the re-routing of the call to the absentee operator in a manner similar to that used for non-numerical P. B. X groups. Thus, the operation of either of relays D*gr* or D*hr* and relay D*jr* will send a signal over make contact D*j*4 and either of make contacts D*g*6 and D*h*6 to the cord circuit to connect the absentee operator.

Calls may be originated on lines which are in the absentee condition, in which case they will be busied in the normal manner and then provide impulses from the same P*d* cycles as busy single lines, so that when a line in this condition is called, the absentee condition will not be given, but the busy condition will be given instead.

*Changed numbers.*—Changed numbers are provided with a particular combination of P*d* sources characterizing this condition, in the manner shown by Table No. I, so that when such a line is selected, the register, by receiving this combination of signals, will operate relays D*ar* and D*jr* which may break down the connection and route the call over make contacts D*a*6 and D*j*6 either to an operator or to a special-tone circuit, as desired, in a manner similar to that used for non-numerical P. B. X groups.

*Dead lines.*—This is similar to the changed number, but a different combination may be provided, as by the operation of relays D*ir* and D*jr* so that if this would be so desired, calls to dead lines may be distinguished from calls to changed numbers by a circuit including make contacts D*i*9 and D*j*6.

*Operation of line finder circuit.*—The line finders and final selectors together constitute one multi-switch for every group of a hundred lines and are served by the same "ESBO" circuit represented in Fig. 6. The operation of a line finder circuit, as represented in Fig. 7, is similar to that of the final selector. The register circuit receives in every case information concerning a single line to which the line finder should be connected from line identification equipment (not shown). All calls handled via line finders are handled as calls to single free lines via final selectors, i. e. on line finders there is never P. B. X hunting, neither is there question about calls directed to changed numbers and dead lines, etc. on which calls are never originated.

The subscriber's line is busied from the line finder in the same way as described in connection with the final selector, i. e. the subscriber's "*c*" conductor will be connected to −48 volts potential via the "*c*" conductor of the line finder which potential is provided from the cord circuit in a manner not shown, whereas the subscriber's "*d*" conductor is connected to source P*d*8 via contact H3 and a resistance of 20,000 ohms at the line finder, for the same purpose as described in conjunction with the final selector.

When the line finder is in the conversational condition, the "*d*" conductor leading to the cord circuit may be used for two different purposes viz. metering and identification. For the purpose of metering, the "*d*" conductor at the cord circuit is connected to +24 volts positive potential which, via make contact HB1 and a rectifier, is transmitted to the E contact of the line finder switch and is further extended thereby to the subscriber's meter SM, Fig. 7 in the subscriber's line circuit.

This positive potential is not able to pass through two other rectifiers which are connected to the make contact of HB1 and which are provided for identification purposes. Connection may be extended via the cord circuit from a distant circuit from which identification of the calling line is wanted to the "*d*" conductor, and for the purpose of identification, this "*d*" conductor will be connected at this distant circuit to a negative battery potential. The "*d*" conductor is extended at the first line finder via two branching rectifiers to two sets of gates, one of which, GIG, is located at the first line finder circuit and the other of which is connected via the "D" contact of the first line finder from the subscriber's line circuit.

Considering the gates at the first line finder first, these are connected to one individual source each out of three groups P*a*1 . . . 5, P*b*1 . . . 5 and P*c*1 . . . 4, of which the characteristics are the same as for those connected to the final selector "ESBO" circuit varying in voltage from −40 volts to −16 volts.

Further, connection is provided via a 20,000 ohm resistance to source P*d*1, of which the characteristics also are the same as for those connected to the final selector "ESBO" circuit, the voltage varying between −40 and −16 volts. The point at which the three gates are connected to the 20,000 ohm resistance will be normally at a relatively negative potential, so long as any of the sources connected is relatively negative, and only when all four sources involved are relatively positive, will this point become relatively positive. By "relatively positive" in this case is meant a potential of −16 volts, as this is the potential at which the groups of sources concerned will be when providing a relatively positive potential, whereas by "relatively negative" is meant a potential of −40 volts. The negative potential connected to the "*d*" lead by the circuit requiring identification would be −44 volts, or a more negative potential, and is connected to this "*d*" lead via a high resistance, so that this "*d*" lead may change to a potential of substantially −16 volts only at the time the four sources referred to coincide in providing a relatively positive impulse. This is so because the rectifier interconnecting the gates with the "*d*" conductor in this condition will be conductive. The rectifier interconnecting the "*d*" conductor with the E contact of the line finder in this condition will be non-conductive because the "*d*" lead is negative with respect to ground potential connected through the service meter to the *e* conductor of the subscriber's line. Also the other rectifier by which the "*d*" lead is connected to the D contact of the line finder switch is non-conductive in this condition because the potential prevailing on the "*d*" conductor of the subscriber's line at this moment is relatively negative with respect to −16 volts.

From this it follows that the potential transmitted from the sources at the first line finder to the "*d*" conductor at the moment of coincidence is not affected by potentials prevailing either on the conductors *e* or *d* of the subscriber's line circuit.

The "*d*" lead at the subscriber's line circuit is connected to the explorer of the final selector "ESBO" circuit, as may be seen by referring to the subscriber's line circuit, Fig. 7, which shows that the "*d*" lead from the line finder circuit is extended metallically through the subscriber's line circuit to the *d*1 lead of the final selector which extends to the explorer at the "ESBO" circuit, Fig. 6. The explorer at the "ESBO" circuit acts in a similar manner, as explained in conjunction with the gates provided at the first line finder, to produce one impulse in a time unit which is characteristic for the calling line. The equivalent effect of source P*d*1 at the first line finder, used in connection with the determination of the line finder group, is the effect of source P*d*8, which at the first line finder is connected to the "*d*" lead of the subscriber line via make contact H3. The result of this is, that in a time unit forming part of the cycle of sources P*d*1, an impulse will be sent to the "*d*" lead at the first line finder which is characteristic of the identity of the first line group, as determined by the sources connected to the three gates at the line finder circuit, whereas in a time unit in a cycle determined by source P*d*8, one impulse will be transmitted to this "*d*" lead which arrives in a time unit characteristic for the tens and units figures of the calling number.

As has already been mentioned, the impulse sources used in connection with the explorer at the final selector "ESBO" circuit and also those used at the first line finder circuit are of the type which vary their potential between the values of −40 volts and −16 volts, whereas in other parts of the system, e. g. in the group selector, impulse sources are used which vary their potentials between the values 0 and +16 volts. A few words should be said about the reasons why the latter potentials are not employed in connection with the circuits described here.

It will be noticed that all potentials used for identification on the "*d*" lead at the first line finder are negative with respect to ground, so that these potentials will not be able to pass through the rectifier leading to the service meter via contact "E" of the switch. It would have been possible to use impulse sources having potentials varying between 0 and +16 volts, provided that for the purpose of metering a negative potential had been used. In this case the rectifier inserted in the lead to the "E" contact of the switch evidently would have to be connected in the reversed direction, so that it would pass potentials which are negative with respect to ground only, this case assuming that for the purpose of identification potentials were used which were varying between 0 and +16 volts.

The disadvantage of this arrangement is, however, that at the moment a metering impulse is over, the self-induction of the meter causes a potential of a positive value to be created on the service meter wire, which in this case could be transmitted via the rectifier inserted in series with the connection to the "*d*" conductor, to all of the gates, both at the line finder circuit and at the final selector "ESBO" circuit. Such a positive potential might be a source of trouble, because it might cause the production of a false impulse at an unwanted time to the explorer of the final selector. By using the set of potentials in the circuits as now described, the potential created on the service meter wire at the moment the positive metering potential is interrupted, assumes a high negative value and this potential is unable to provoke a false impulse at the explorer at the "ESBO" circuit: its only result may be the suppression of one of the impulses which, however, cannot cause any false selection.

A few words should be said also about the reasons why in the "ESBO" circuits for the group selectors, impulses have been employed with potentials varying between 0 and +16 volts, instead of using the same range of potentials as employed at the final selector "ESBO" circuit. In the first place, it should be observed that the conditions as set by the explorer of the subscriber's line circuit, which explores the calling condition of the lines, are such that the normal potential in the non-calling condition is signalled by a change of this potential to a more positive value. This means that the impulses produced are relatively positive.

The electronic equipment at the registers is therefore designed to work on impulses which are relatively positive compared with a normal condition which is relatively negative, and for these reasons it is desirable that the whole system shall be designed to work with impulses of a relatively positive value.

This applies, therefore, also to the impulses as used in connection with group selectors and two solutions were possible here: either to use impulses which are negative with respect to ground (e. g. with a normal potential of −40 volts and an impulse potential of −24 volts), or to use impulses which are positive with respect to ground (e. g. of which the potential is normally at 0 volt and have a potential of +16 volts, during the impulse period). The latter arrangement has been selected, because in so doing the selector circuit could be busied by a ground potential on the "*e*" conductor, whereas otherwise a battery potential of −40 volts or a more negative potential would have been required for this purpose. This is objectionable, because firstly, the busying of the test lead in the group selector preferably has to happen by a direct potential, because it serves also for the holding of the horizontal magnet in the next selector, and secondly, because the presence of a false ground on any test lead would bring this circuit into the free condition.

By using a set of potentials which are positive with respect to ground in connection with group selectors, the busying of the test lead may be done by a direct ground, and consequently also the presence of a false ground on the test lead will render the corresponding outlet in the preceding selector busy, whereas this direct ground may also be used conveniently for holding the individual horizontal holding magnet of the next selector.

When the individual selector is released at the end of the connection, this happens by the opening of the ground at the preceding selector on the *e* lead, which releases the individual magnet.

This magnet is then left connected momentarily to the test lead, but the presence of −48 volts potential through this magnet on the test lead still holds this in the busy condition, because this potential is not able to produce impulses through the explorer. After the individual magnet has released, test potential is connected again at break contact H2. Test potential is present on the outlet via a contact on break jack BJ and an individual protective resistance of 10,000 ohms, and is obtained from a common fuse provided at the "ESBO" circuit serving the multi-selector. It is connected at the group selector "ESBO" circuit via make contacts D*l*2 or E*l*2 in parallel and in the final selector "ESBO" circuit via make contacts D'2 or E'2 in parallel, which serve to ascertain the presence of −48 volts potential at the "ESBO" circuit, because only in this case will relays D*lr* and E*lr* and D*r'* and E*r'* be energized. In the absence of −48 volts potential in the "ESBO" both of these relays will release (which otherwise is never the case), and disconnect the +24 volts test potential from the test lead of all individual selectors, so that these are thereby rendered inaccessible. A ground via 10,000 ohms is connected to the common point from which this test potential is obtained, in order to bring all test leads in this condition at ground potential.

While the principles of the invention have been described above in connection with specific embodiments, and particular modifications thereof, it is to be clearly understood that this description is made only by way of example and not as a limitation on the scope of the invention.

This application is a continuation in part of my prior filed applications, Serial No. 206,691, filed January 13, 1951, and Serial No. 205,916, filed January 13, 1951.

What is claimed is:

1. An automatic telecommunication exchange comprising a plurality of selector stages, each including a plurality of individual selector switch circuits and common control circuits each normally connected to a number of said individual selector switch circuits, a plurality of register controllers, connecting equipment connected between said register controllers and a plurality of said common control circuits for directly connecting said register controllers and said common control circuits for the control of selection at the associated selecting stages, said connecting equipment comprising connecting switches, each connecting switch being individual to a register controller and connected thereto, said connecting switches being arranged to connect said register controller to the common control circuits of at least one selector stage, means at each selector stage controlled by the associated common control circuit for connecting an individual switch to the individual switch of a succeeding selector stage, and means in each selector stage controlled by said last mentioned means and connected to the register controller which is controlling said selector stage over said connecting equipment for signalling back to said register controller the identity of a common control circuit to which connection is to be made for controlling selection at a succeeding selector stage.

2. An automatic telecommunication exchange, as claimed in claim 1, and in which the signalling means comprises means for producing pulses in a periodic cycle of time positions, each time position being characteristic of a particular common control circuit.

3. An automatic telecommunication exchange, as claimed in claim 2, and in which additional means is provided in the signalling means for producing multiples of the periodic cycle of time positions, the time positions in each multiple being characteristic of the type of selector stage to which a common control circuit belongs.

4. An automatic telecommunication exchange, as claimed in claim 1, and in which connecting equipment is also provided directly between register controllers and common control circuits at a line finder stage.

5. Selector equipment for an automatic telecommunication exchange, comprising a plurality of outlets, means for selecting an outlet, a signalling channel, and means for signalling the condition and class of said selected outlet in one operation, over said channel.

6. Selector equipment, as claimed in claim 5, in which the means for signalling the condition and class of an outlet in one operation also includes means for signalling the identity of said outlet.

7. Selector equipment for an automatic telecommunication exchange, as claimed in claim 6, in which the signalling means comprises means for signalling the identity and idle condition of an outlet by one signal and for signalling the identity and busy condition of the outlet by a different signal.

8. Selector equipment, as claimed in claim 7, in which the signalling means comprises means for applying electrical impulses to the signalling channel in different time positions of a pulse time cycle for signalling information about an outlet and means for allocating different time positions in said cycle to different outlets.

9. Selector equipment, as claimed in claim 8, in which said allocating means comprises means for allocating two different time positions in said cycle to each outlet, and means for applying pulses to the signalling channel in turn in two different time positions in the same cycle of time positions for signalling information about an outlet.

10. Selector equipment, as claimed in claim 9, further comprising means for setting up a communication path to a selected outlet, said signalling means being entirely independent of the operation of said means for setting up a communication path.

11. Selection control equipment for an automatic telecommunication exchange comprising a plurality of outlets, means for selecting an outlet, a signalling channel, means for signalling the identity and idle condition of said selected outlet by one signal over said channel and the identity and busy condition of said selected outlet by a different signal over said channel, and signal responsive means connected to said channel and adapted to control said selecting means by detecting signals characteristic of the identity, condition, and class of outlets in one operation.

12. Selection control equipment, as claimed in claim 11, further comprising means for recording the identity of a wanted outlet or group of outlets, and in which the signal responsive means includes comparator means for comparing a signal indicating the identity of an outlet with said record of the identity of a wanted outlet or group of outlets.

13. Selection control equipment for an automatic telecommunication exchange comprising a plurality of outlets, means for selecting an outlet, a signalling channel, means for signalling the identity and idle condition of said selected outlet by one signal over said channel and the identity and busy condition of said selected outlet by a different signal over said channel, signal responsive means, including means for detecting said signals in accordance with the time factor characteristic of said signals, connected to said channel and adapted to control said selecting means by detecting signals characteristic of identity, condition, and class of outlets in one operation, and means for recording the identity of a wanted outlet or a group of outlets, said signal responsive means including comparator means for comparing a signal indicating the identity of an outlet with said record of the identity of a wanted outlet or group of outlets.

14. Selection control equipment, as claimed in claim 13, further comprising means for recording the class of a selected outlet.

15. Selection control equipment, as claimed in claim 14, in which the signal detecting means comprises means for detecting a plurality of signals in one cycle of a recurring cycle of time positions.

16. Selection control equipment, as claimed in claim 15, further comprising means for controlling private branch exchange hunting, said means being solely under control of said signal responsive means.

17. Automatic telecommunication exchange comprising a plurality of outlets, selector equipment for selecting an outlet, selection control equipment, means in the selector equipment for signalling the identity, condition, and class of a selected outlet to said selection control equipment in one operation, signal responsive means in the selection control equipment adapted to select an outlet at a selector stage, and signal responsive means in the selection control equipment for determining the class of outlet selected, said selection means and said class determining means both responding during said single signalling operation.

18. Automatic telecommunication exchange, as claimed in claim 17, in which the signalling means includes means for transmitting a plurality of pulses in different time positions in a pulse-time cycle to characterize each outlet.

19. Automatic telecommunication exchange, as claimed in claim 18, in which the signalling means includes static electric signalling means in said selector equipment for sending a series of signals characteristic of the identity, condition and class of the outlets of a selector multiple, and in which the signal responsive equipment in said selection control equipment includes means for selecting an idle outlet in a wanted direction, or an idle outlet of a wanted private automatic branch exchange solely in response to said signals from said static electrical signalling means, whereby selection can be made without any operation of the switching device by which communication is to be eventually extended to a selected outlet.

20. Automatic telecommunication exchange, as claimed in claim 19, in which said signal responsive equipment includes means for controlling selection of an idle outlet of a wanted private automatic branch exchange with non-consecutive outlets, or an idle outlet of a wanted private automatic branch exchange with consecutive outlets.

21. Selector equipment as claimed in claim 5, further comprising means for modifying the setting of said signalling means when an outlet is busy and means for transmitting signals when an outlet is busy which are different from those sent when the outlet is free.

22. Selection equipment as claimed in claim 5, in which the signalling means comprises signal transmitting equipment for sending two pulses per outlet in a single cycle of a recurring cycle of time pulses, and means for modifying one of said pulses to indicate a busy outlet positively.

23. An automatic telecommunication exchange comprising a plurality of selector stages, groups of individual selector switch circuits and common control circuits at a selector stage, each common control circuit being connected with one group of individual selector switch circuits, register control equipments for controlling selection at said selector stage in accordance with requirements received from a calling party, static electrical means in each of said common control equipments for signalling the identity, condition, and class of both individual outlets and of private branch exchange outlets from the associated group of selector switches to said register control equipment, and circuit arrangements between said common control equipments and said register control equipments, whereby a plurality of register control equipments can select individual outlets and private branch exchange outlets in response to the same continuous stream of selection signals from a single common control circuit to which they are connected during the same period.

24. An automatic telecommunication exchange, as claimed in claim 23, in which each common control equipment comprises means for controlling the setting of an associated selector switch to set up a communication connection to a selected outlet, and means for causing a common control equipment to send a stream of selection signals to at least one register control equipment connected thereto and simultaneously control the setting of an associated selector switch in conjunction with another register control equipment connected thereto.

25. An automatic telecommunication exchange, as claimed in claim 23, in which said groups of selector switches each comprise both final selectors and first line finders and means for causing selecting operations for both line finders and final selectors to take place simultaneously under the control of different register control equipments.

26. An automatic telecommunication exchange, as claimed in claim 23, in which means is provided in the static electrical means for signalling the identity, condition, and class of the outlets in one operation, independently of the selector switches with which it is associated.

27. An automatic telecommunication exchange, as claimed in claim 24, further comprising sources of time impulses arranged to provide a recurring cycle of time impulses adequate for signalling information about all the outlets of a selector multiple, and means connecting said sources with the control equipments for signalling the identity, condition, and class of all outlets of a multiple in one of said impulse time cycles.

References Cited in the file of this patent

UNITED STATES PATENTS

| | | |
|---|---|---|
| 2,612,564 | Obermann | Sept. 30, 1952 |
| 2,620,400 | Snijders | Dec. 2, 1952 |